US009468164B2

(12) United States Patent
Dean et al.

(10) Patent No.: US 9,468,164 B2
(45) Date of Patent: Oct. 18, 2016

(54) AUTOMATIC IRRIGATION SYSTEM PURGING

(71) Applicants: Robert E. Dean, Lafayette, CO (US); Todd R. Hall, Longmont, CO (US)

(72) Inventors: Robert E. Dean, Lafayette, CO (US); Todd R. Hall, Longmont, CO (US)

(73) Assignee: Pellaero, LLP, Lafayette, CO (US)

( * ) Notice: Subject to any disclaimer, the term of this patent is extended or adjusted under 35 U.S.C. 154(b) by 0 days.

(21) Appl. No.: 15/051,261

(22) Filed: Feb. 23, 2016

(65) Prior Publication Data

US 2016/0165820 A1 Jun. 16, 2016

Related U.S. Application Data

(62) Division of application No. 13/557,860, filed on Jul. 25, 2012, now Pat. No. 9,295,203.

(60) Provisional application No. 61/602,471, filed on Feb. 23, 2012.

(51) Int. Cl.
| | |
|---|---|
| *A01G 25/16* | (2006.01) |
| *B05B 12/02* | (2006.01) |
| *B05B 12/04* | (2006.01) |
| *B05B 15/02* | (2006.01) |
| *B05B 15/00* | (2006.01) |

(52) U.S. Cl.
CPC ............ *A01G 25/165* (2013.01); *A01G 25/16* (2013.01); *B05B 15/00* (2013.01); *Y10T 137/0419* (2015.04); *Y10T 137/4238* (2015.04)

(58) Field of Classification Search
CPC .. A01G 25/16; A01G 25/162; A01G 25/165; B05B 12/02; B05B 12/04; B05B 12/08; B05B 12/085; B05B 12/087; B05B 12/14; B05B 15/00; B05B 15/02; B05B 15/025; Y10T 137/0419; Y10T 137/4238
See application file for complete search history.

(56) References Cited

U.S. PATENT DOCUMENTS

| | | | | |
|---|---|---|---|---|
| 4,174,067 A | * | 11/1979 | Watanabe ............. | B05B 15/025 239/112 |
| 5,355,905 A | * | 10/1994 | Burgess ................. | A01G 25/00 137/1 |
| 2008/0087749 A1 | * | 4/2008 | Ruskin ................. | A01G 25/165 239/542 |
| 2008/0302882 A1 | * | 12/2008 | Rosselli ................ | A01G 25/00 239/1 |
| 2011/0079654 A1 | * | 4/2011 | Bailey ................... | A01G 25/16 239/1 |
| 2012/0325923 A1 | * | 12/2012 | Hartfelder ............. | A01G 25/16 239/1 |

* cited by examiner

*Primary Examiner* — Darren W Gorman
(74) *Attorney, Agent, or Firm* — Jennifer L. Bales; Macheledt Bales LLP

(57) ABSTRACT

An automated irrigation purge system utilizes a pressure purge method of discharging compressed air from a reservoir through selected irrigation zones with feedback from pressure switches to determine when to open and close each zone valve. No programming or user interaction is required beyond starting the system. The system can operate with a wide variety of irrigation systems, with varying number of zones, pipe lengths, pipe diameters, number and variety of sprinkler heads or outlets, and terrain slope. The system tracks the pressure transition time from high pressure to low pressure for each zone as it is blown out. When the current transition time is within a specified range from the previous transition time, the system knows the water has been sufficiently purged from that zone. The purge system can protect the irrigation system from high-pressure conditions, handle multiple error conditions, and maintain water valve settings during power loss.

18 Claims, 32 Drawing Sheets

AUTOMATIC IRRIGATION SYSTEM PURGING

BACKGROUND OF THE INVENTION

1. Field of the Invention

The present invention relates to methods and apparatus for automatically purging water from irrigation systems.

2. Discussion of Related Art

Irrigation systems installed in regions where cold climate conditions exist can be damaged by freezing of the water contained in the irrigation system and require winterization to prevent this damage. Compressed air is commonly used to force the water out of the irrigation system. Common practice is to hire a contractor who utilizes an industrial grade, engine driven, air compressor with a high flow rating at high pressures and a large volume capacity reservoir to connect to the existing irrigation system. The engine driven air compressor and reservoir are generally large, expensive, and noisy devices pulled by a truck or in the bed of a truck. The contractor must be granted access to the structure to manually turn off the main water supply. The air compressor and reservoir are then connected to the existing irrigation system outside the structure. The contractor then steps through each irrigation zone, blowing air through the selected zone forcing the water out through the sprinkler heads, drips, or misters. The contractor observes each zone and when only air is being emitted from the sprinkler heads, drips, or misters, they manually move to the next zone.

It is common knowledge to step through the zones one at a time to reduce the amount of air required to purge the water. Also, irrigation controllers don't allow more than one zone to be on at a time. Therefore to open more than one zone valve at a time would require the contractor to find each zone valve box located around the structure and manually actuate each zone valve. This is time consuming and many times the remote valve boxes are covered by landscape material and difficult to locate. By default, most contractors just step through each zone using the irrigation controller.

It is well known that a home owner can achieve similar purge results with a smaller air compressor and reservoir but take significantly longer to run and may require multiple cycles per zone. Both methods are labor intensive and require the operator to work outside in uncomfortable, cold climate conditions. Both the contractor and homeowner have to be diligent in observing air pressures so as to not damage the irrigation system by exceeding the rating of the piping, the valves, or the sprinkler heads.

Depending on weather conditions and the time of year, the irrigation system user must estimate when they want the system purged of water. If they err on the conservative side and purge the system too soon, they may have landscape damage if warm, dry weather returns. If they err on the aggressive side and purge the system too late, they may have irrigation system freeze damage. Once purged, they are hesitant to turn the water back on due to the inability to have it purged again that same day and the expense involved.

New landscaping and existing trees and shrubs require watering in cold dry months. It becomes cumbersome and time consuming to pull out the garden hose and water the landscaping during cold weather. The landscaping can be easily watered using the irrigation system then immediately followed by an automatic purge of the system.

Bailey in U.S. Pat. App. No. 2011/0079654, teaches a purging system that is mainly flow based over a given amount of time. It utilizes an expensive, complicated air supply pump and feedback system where it maintains a consistent pressure in the zone by adjusting the speed of the air supply. Variable speed motors require expensive controllers. Also, in order to monitor the pressure in the system, a more expensive pressure sensor must be used to provide continuous pressure feedback. Even with only one zone open at a time, the flow based systems require large capacity flow pumps, with a very high cubic-feet per minute capability, to reach a stable pressure once the water has been forced from the zone. The flow rate of air that can be emitted from a sprinkler head is greater than the flow rate of water that can be emitted. Therefore, to reach a stable air pressure, large flow rates must be maintained and seem overkill for the simple task being accomplished. Also, Bailey has stated that the necessary outputs of the air source may increase if there is no air reservoir to assist with the purging.

Irrigation systems are designed to operate with water pressures up to 80 psi. The purge system that quickly discharges compressed air from an air reservoir, known as the pressure purge method, staying below pressures of 80 psi, has proven to be the most economical and accommodative to the widest range of irrigation piping systems and air compressors. A successful irrigation purge system should accommodate unique irrigation systems with varying number of zones, unequal pipe lengths, different pipe diameters, different number and variety of sprinkler heads or outlets, and varying degrees of slope of the terrain being irrigated. Also, users who already own a suitable air compressor will prefer to use it in conjunction with the purge system.

There is a need in the art for methods and apparatus for automatically purging water from irrigation systems such as an irrigation purge system that can utilize a common, traditional air compressor on unique and diverse irrigation piping in a cost effective manner, protect the system from high pressure conditions, be fully automatic, know when each zone has been purged of water, handle multiple error conditions, maintain water valve settings without consuming power and during a power loss or unplugged condition, and seamlessly integrate with all irrigation controllers.

SUMMARY OF THE INVENTION

It is an object of the present invention to provide methods and apparatus for automatically purging water from irrigation systems.

An improved fully automated irrigation purge system according to the present invention utilizes a pressure purge method of discharging compressed air from a reservoir through selected irrigation zones with feedback from pressure switches to determine when to open and close each irrigation zone valve. No programming or user interaction is required beyond starting the system. The system can be used with any commercial irrigation controller. It can be successfully utilized in a wide variety of irrigation systems, with different number of zones, various pipe lengths, different pipe diameters, different number and variety of sprinkler heads or outlets, and varying degrees of slope of the terrain being irrigated. The air reservoir can be charged at any reasonable rate using a traditional 120 VAC air compressor. A higher airflow rate compressor will take less time to charge the reservoir than a lower airflow rate compressor, but both will accomplish the task. The air compressor and reservoir can be disconnected and used elsewhere when not needed for purging.

Advantages of this improved irrigation purge system include providing a simplified, cost effective means of automatically purging the irrigation system of water. The improved purge system can be added to an existing irrigation system or can be installed with a new irrigation system. Its mounting is flexible and can be placed in the structure next to the irrigation controller or next to the irrigation water supply, wherever there is a 120 VAC outlet. It can be implemented with an automatic latching water valve or with a manual water valve. The purge system automatically tracks the pressure transition time from high pressure to low pressure for each zone. For example, a drop in pressure from 60 psi to 10 psi could constitute a pressure transition. When the current pressure transition time is within a specified range from the previous pressure transition time, the system knows the water has been sufficiently purged from that zone. Still further advantages will become apparent from a study of the following description and the accompanying drawings.

As a feature, the automatic purge system of the present invention can protect the irrigation system from high pressure conditions, be fully automatic, know when each zone has been sufficiently purged of water, handle multiple error conditions, maintain water valve settings during a power loss or unplugged condition, and seamlessly integrate with commercial irrigation controllers.

A method of automatically purging an irrigation system according to the present invention includes the steps of removing water pressure to the system, designating an irrigation zone to blow-out, blowing water out of the designated zone using pressurized air, tracking pressure within the irrigation system from a high pressure to a low pressure state, wherein the designated zone is blown-out when the low pressure state is reached, designating a new irrigation zone, and repeating these steps until all desired zones are blown-out, and blowing out the desired zones a specified number of times or cycles.

In some embodiments the specified number of blow-out cycles for each zone is determined by the steps of measuring the amount of time for a designated zone to be blown-out, comparing the measured blow-out time to a reference time, and setting the specified number of blow-out cycles for the designated zone to a number based on comparing the measured blow-out time to the reference blow-out time.

For example, the invention might compare the measured blow-out time to either a predetermined time or to a previously measured blow-out time and set the specified number of blow-out cycles to the current number of blow-out cycles when the measured blow-out time is within a desired margin of either a predetermined time or of a previously measured blow-out time. In general, the specified number of blow-out cycles is either set to a predetermined value or is set to a value based on a previous amount of time for a zone to be blown-out.

In some embodiments each irrigation zone is blown-out in sequence and the process is repeated until the specified number of blow-out cycles is reached. As a feature, a designated zone is skipped in the sequence once a specified number of blow-out cycles is reached for that specified zone.

In other embodiments, each designated zone is blown-out until the specified number of blow-out cycles is reached for that designated zone and then a new zone is designated.

Apparatus for automatically purging an irrigation system according to the invention includes an irrigation controller (either existing or integrated) controlling water flow into a plurality of irrigation zones, a low-pressure switch for determining when pressure within the irrigation system passes a low-pressure threshold, a high-pressure switch for determining when pressure within the irrigation system passes a high-pressure threshold, a source of compressed air; and a purge controller including circuitry constructed and arranged to determine pressure within the irrigation system by monitoring the low-pressure switch and the high-pressure switch; and to apply compressed air to designated irrigation zones to blow water out of the designated irrigation zones based upon the pressure within the irrigation system.

The purge controller might further include circuitry for defining a designated zone as blown-out when the pressure within the irrigation system goes from a high pressure state to a low pressure state, and circuitry for blowing out each designated zone until a specified number of blow-out cycles is reached. Further, it may include circuitry for measuring the amount of time a designated zone takes to be blown-out and for setting the specified number of blow-out cycles based upon a measured blow-out time.

Generally the circuitry for setting the specified number of blow-out cycles further includes circuitry for limiting the specified number of blow-out cycles to a maximum value. The purge controller may include a switch, such as a three-way switch connected to the purge controller, the switch and the purge controller constructed and arranged such that the purge controller allows water to flow to the irrigation system, prevents water from flowing to the irrigation system, or purges the irrigation system according to the position of the switch. Alternatively, two two-way switches may be used.

The invention may include a latching solenoid controlled by the purge controller for selectively allowing water to flow to the irrigation system. It may also include a quick-release connection for compressed air so that a homeowner may attach a portable air compressor. In some embodiments a control panel is provided and includes the switch and LEDs to notify the homeowner of the state of the system. Preferably, the purge controller uses the irrigation controller's power source (conventionally 24 VAC) to drive the irrigation zone valves. The purge controller's power source may be independent of the irrigation controller and they would be optically isolated from each other. This arrangement would protect the control circuitry of the irrigation controller.

DETAILED DESCRIPTION OF THE INVENTION

Figure 1:
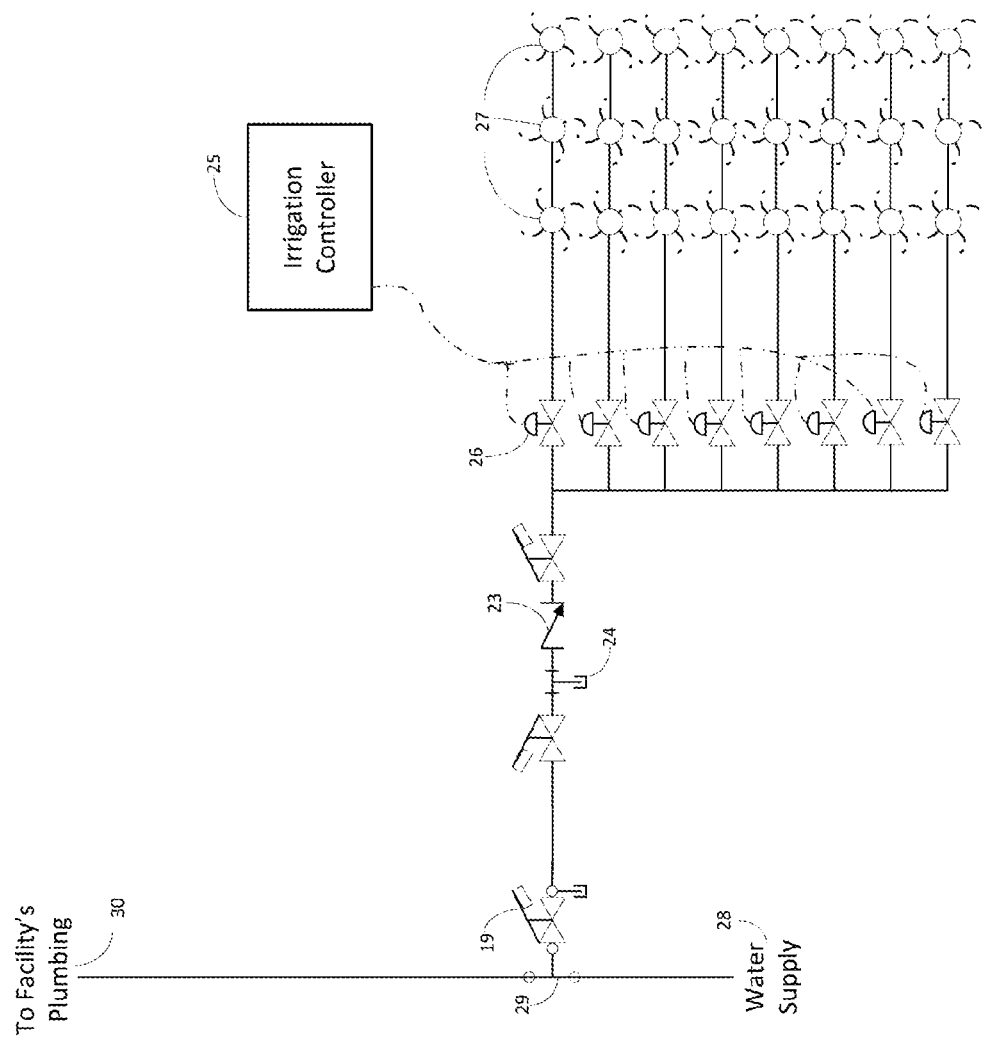
FIG. 1 (Prior Art) is a physical block diagram which illustrates an existing irrigation system.

The following table lists elements of the illustrated embodiments of the invention and their associated reference numbers for convenience.

TABLE 1

REFERENCE NUMERALS

| |
|---|
| 10 purge system |
| 11 latching solenoid water valve |
| 12 low-pressure switch |
| 13 check valve |
| 14 high-pressure switch |
| 15 air reservoir |
| 16 air compressor |
| 17 Purge Controller |
| 18 optional manual water valve |
| 19 manual water valve with drain port |
| 20 tee, inside structure air injection point |
| 21 quick disconnect |
| 22 quick disconnect |
| 23 back flow check valve |
| 24 outside structure air injection point |
| 25 irrigation controller |
| 26 irrigation zone valve(s) |
| 27 sprinkler heads, drips, and misters |
| 28 water supply |
| 29 tee |
| 30 to facility's plumbing |
| 31 green LED |
| 32 red LED |
| 33 purge controller selector switch |
| 40 zone valve control cables |
| 41 air compressor indicator panel |
| 42 pressure switches indicator panel |
| 43 zone purging indicator panel |
| 44 latching solenoid water valve indicator panel |

FIG. 1 (Prior Art) is a physical block diagram illustrating an existing irrigation system. Water supply 28 supplies the facility's plumbing 30 and the irrigation system. A manual water valve with drain point 19 permits a user to manually shut off water to the irrigation system. Air injection point 24 allows the irrigation system to be blown out with compressed air. Backflow check valve 23 prevents water from flowing backward from the irrigation system. Irrigation controller 25 controls which irrigation zone valve 26 is open (generally only one valve at a time). If Irrigation Controller 25 opens a zone valve and water pressure is present, that zone is irrigated by sprinkler heads, drips, misters, etc. 27.

The irrigation system is purged as follows. Water valve 19 is closed to shut off water to the irrigation system. If the human operator purging the system has access to the Irrigation Controller 25, Controller 25 opens and closes the zone valves as the operator directs. Otherwise, the operator must physically open and close the zone valves 26 to the zones. In either case, the zone valve to the first zone is opened and air is injected at injection point 24, blowing out residue water in the first zone. Then the first valve is closed and the zone valve to the second zone is opened and the second zone is blown-out and so on. After all of the zones are blown-out, the operator must go back and repeat the whole process, as only a portion of the water in each zone can be blown out in each cycle. The process may be repeated three or more cycles in order to ensure that the water remaining in the zones is minimal enough not to cause damage to the system if it freezes. The operator then drains the water from the back flow check valve 23 to inside the structure at the manual water valve drain port 19 to ensure excessive water is not present in the pipe exposed to the freezing temperatures outside the structure.

Figure 2A:
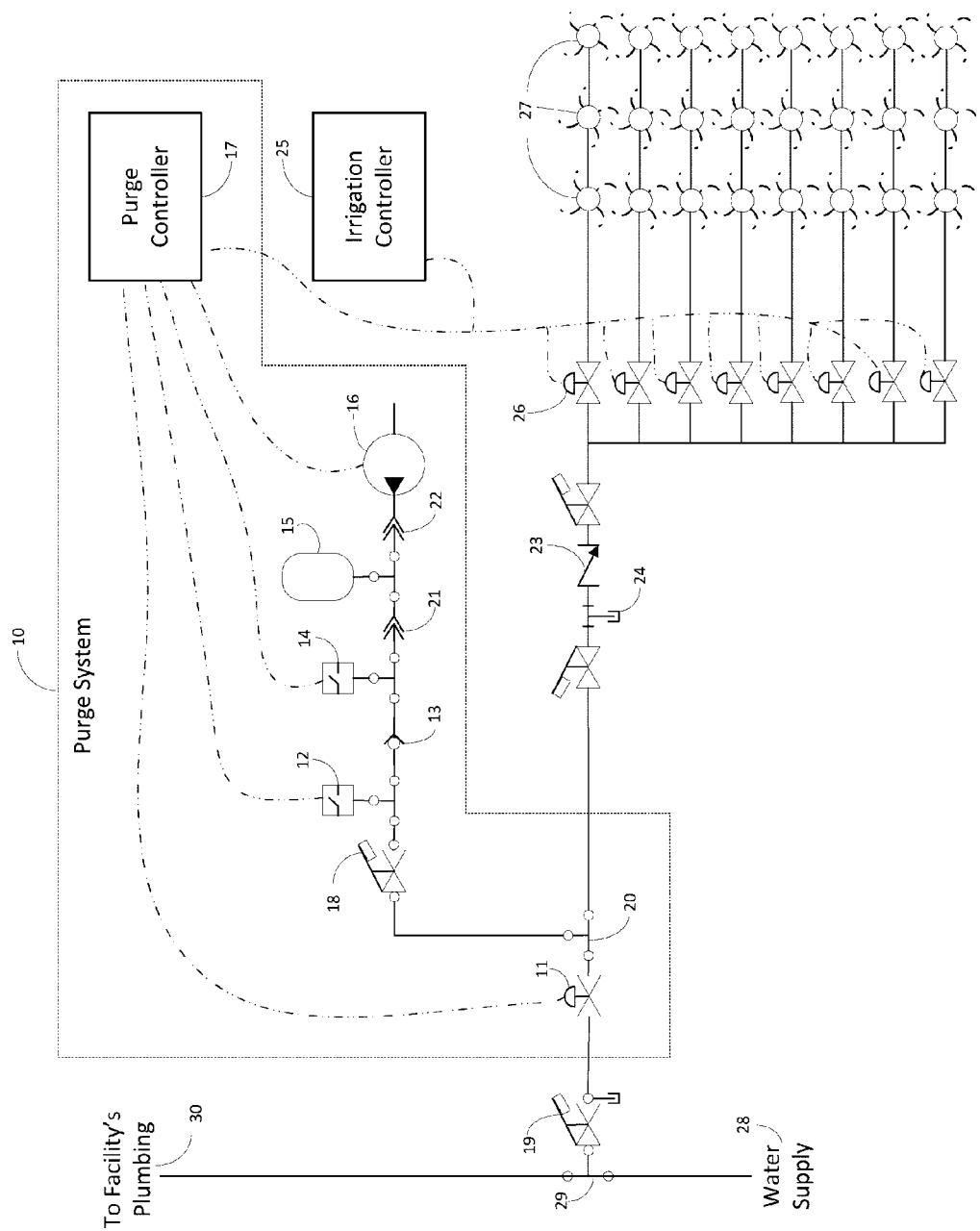
FIG. 2A is a physical block diagram illustrating an automatic purging apparatus according to the present invention used in conjunction with a typical irrigation system such as that shown in FIG. 1.

FIG. 2A is a physical block diagram illustrating an automatic purging apparatus 10 used in conjunction with the irrigation system of FIG. 1. Purge System 10 includes Purge Controller 17, an air compressor 16 and air reservoir 15, a high-pressure switch 14, a low-pressure switch 12, an internal air injection point 20, and various valves and connections 11, 13, 18, 21, 22. Purge Controller 17 takes over the functions performed by Irrigation Controller 25, controlling zone valves 26 leading to watering elements 27.

In a preferred embodiment, Purge Controller 17 requires no interaction from the operator beyond starting the purge process. Hence, in this embodiment, Purge Controller 17 closes solenoid water valve 11 before starting the purge, and the operator is not required to manually close valve 19.

Latching solenoid water valve 11 is placed in the water supply line to the irrigation system downstream of manual water valve with drain port 19 and upstream of air injection point 20. Another smaller optional manual water valve 18 may be placed in line for serviceability of low-pressure switch 12 and check valve 13. A high-pressure switch 14 is located downstream and on the air side of check valve 13. Further downstream is air reservoir 15 and air compressor 16. Both can be quick coupled to the system using quick disconnects 21 and 22. This allows the air compressor 16 and air reservoir 15 to be used for other applications when not needed to purge the irrigation system.

Main water supply line 28 feeds to the facility or structure 30 and is directed to the irrigation system by tee 29. Back flow check valve 23 and traditional air injection point 24 are located outside the structure at the highest point in the irrigation system. Multiple irrigation zone valves 26 are located downstream of the back flow check valve 23 and they control when water flows to the multitude of sprinkler heads, drips, or misters 27 in each zone. When the system is not being purged, Irrigation Controller 25 controls the opening and closing of irrigation zone valves 26 by switching 24 VAC to the solenoid located at each zone valve 26. Purge Controller 17 can perform this same function, for example by using the same 24 VAC power source used by Irrigation Controller 25 and closing a relay within Purge Controller 17 to provide power to the selected irrigation zone valve 26.

Figure 2B:
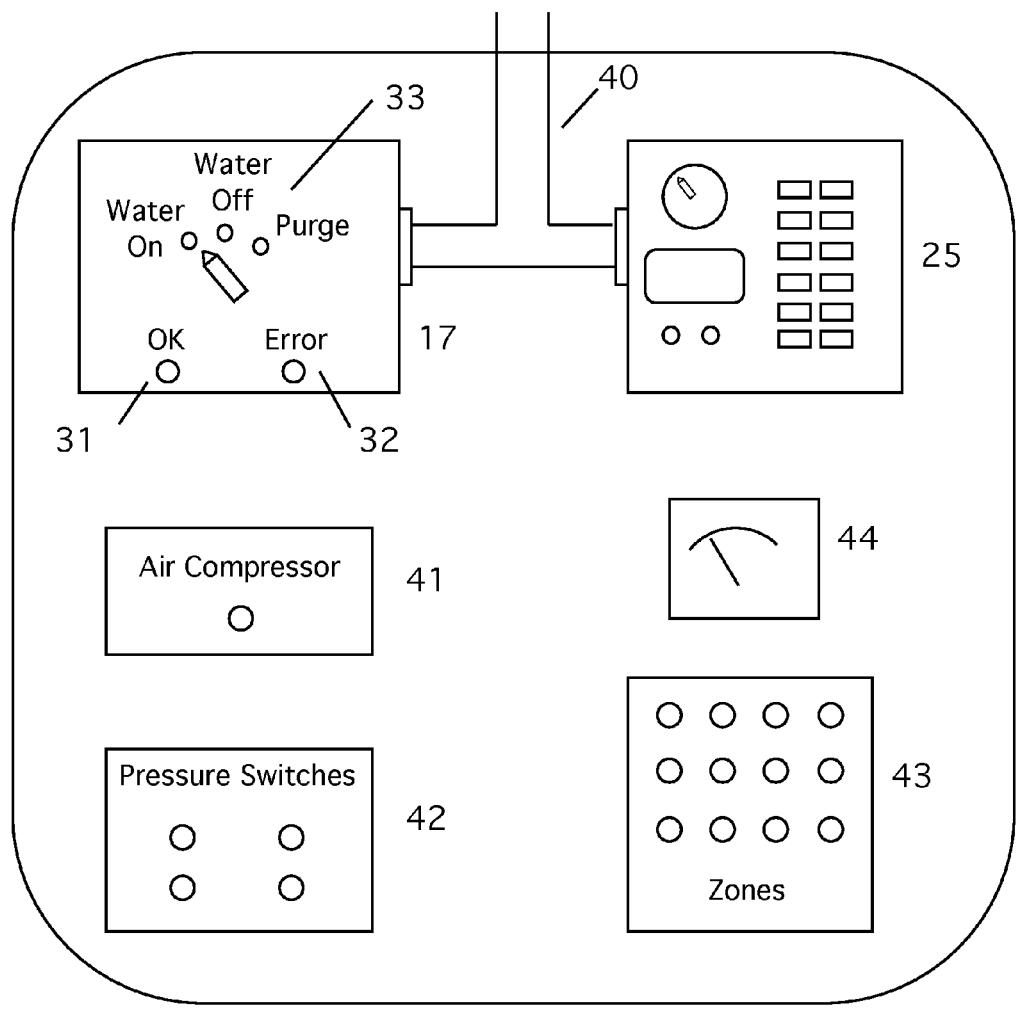
FIG. 2B is an example of a control station for use with the purging apparatus.

FIG. 2B illustrates a control station that might be used in conjunction with purge system 10. While it is not necessary for a user to monitor the operation of Purge Controller 17 in detail, such a control station may be desirable for some users. Purge Controller 17 includes a selector switch 33, which may be set to "Water Off," "Water on," or "Purge." A set of LEDs (generally a green "OK" LED 31 and a red "Error" LED 32) are used to notify the user of the state of the system. Table 2 below indicates a set of errors and associated LED blink signals. Zone indicator lights 43, an air compressor indicator 41, pressure switch indicators 42, and a latching water solenoid valve indicator 44 are optional. Conventional irrigation system controller 25 might be located on the control station panel for convenience.

When Purge Controller 17 is set to "Water On" via selector switch 33, Purge Controller 17 checks for error conditions, turns on the water, and continues to monitor the position of selector switch 33 as well as the positions of low-pressure switch 12 and high-pressure switch 14. From there, the irrigation system runs in the traditional manner. Irrigation controller 25 provides control signals to zone valves 26 as shown in FIG. 1.

Figure 6A:
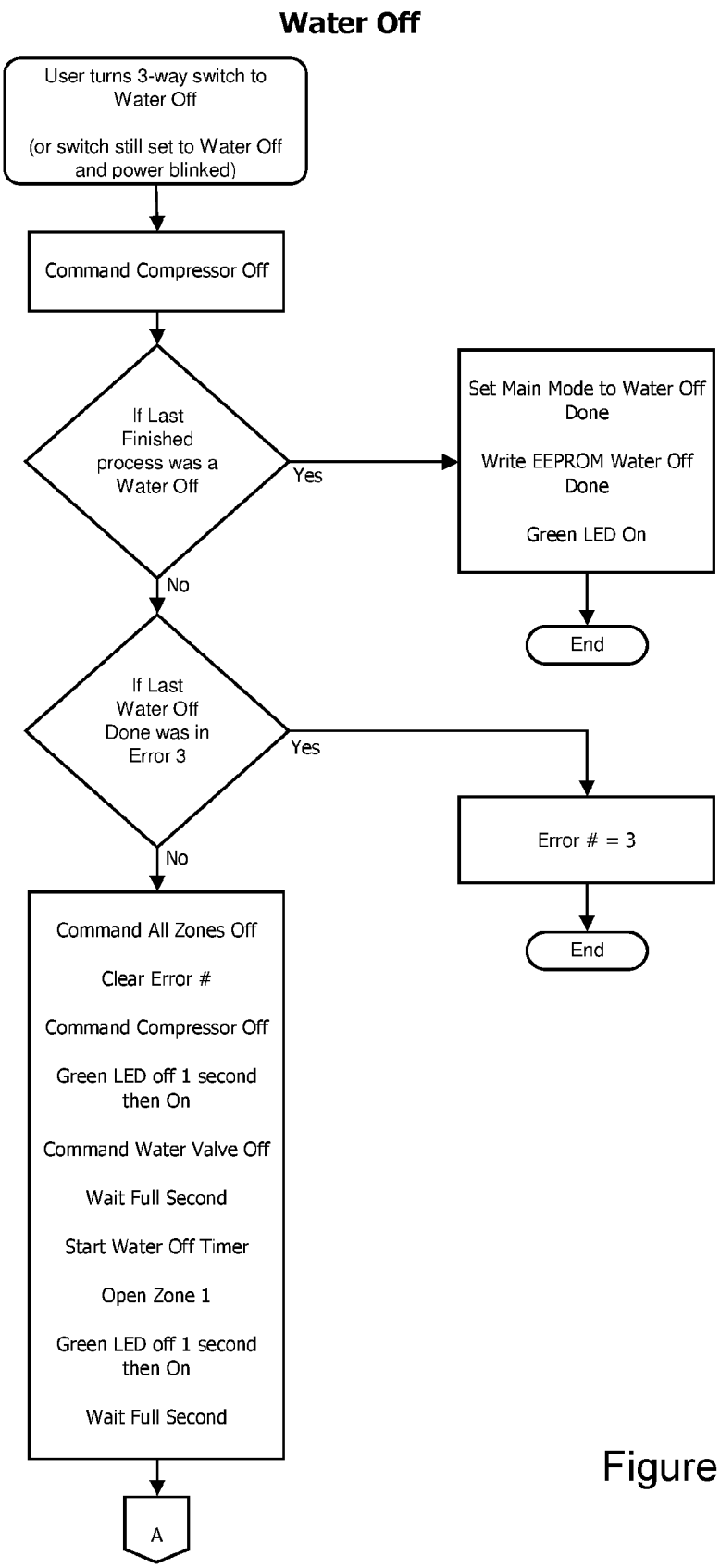
FIG. 6 comprises FIGS. 6A-6O and shows detailed flow diagrams illustrating a specific embodiment of the present invention in detail.
Figure 6B:
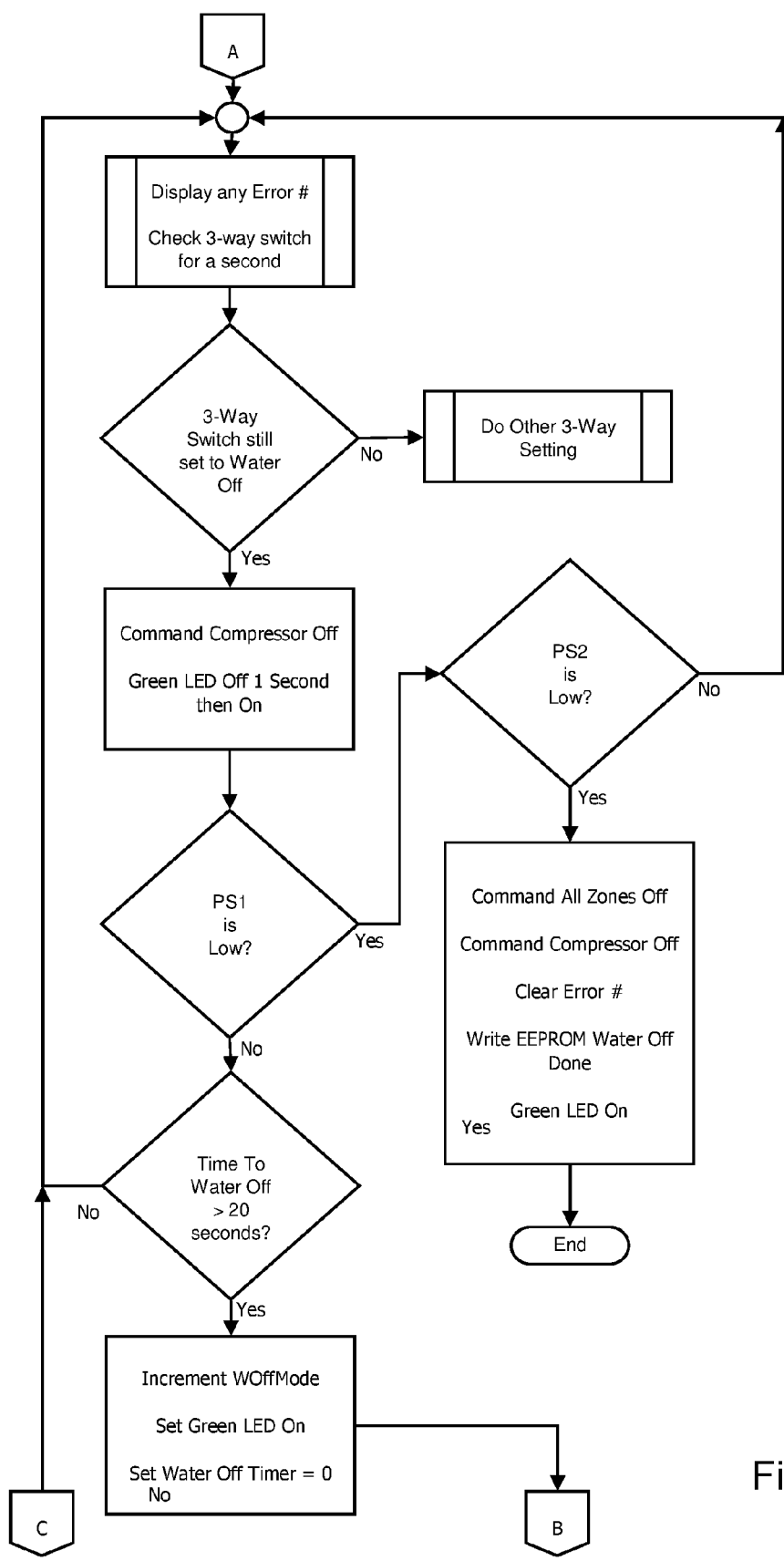
Figure 6C:
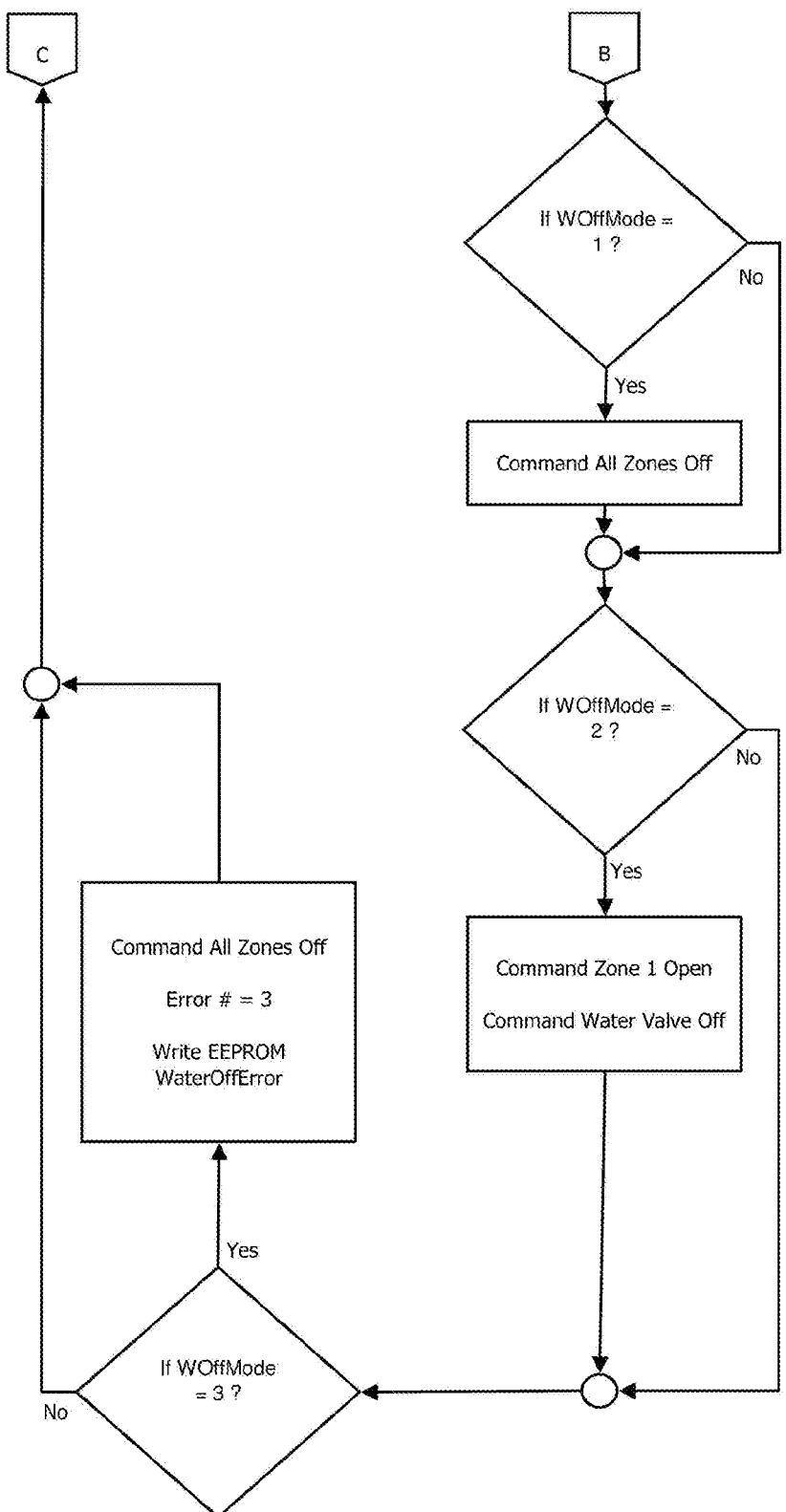
Figure 6D:
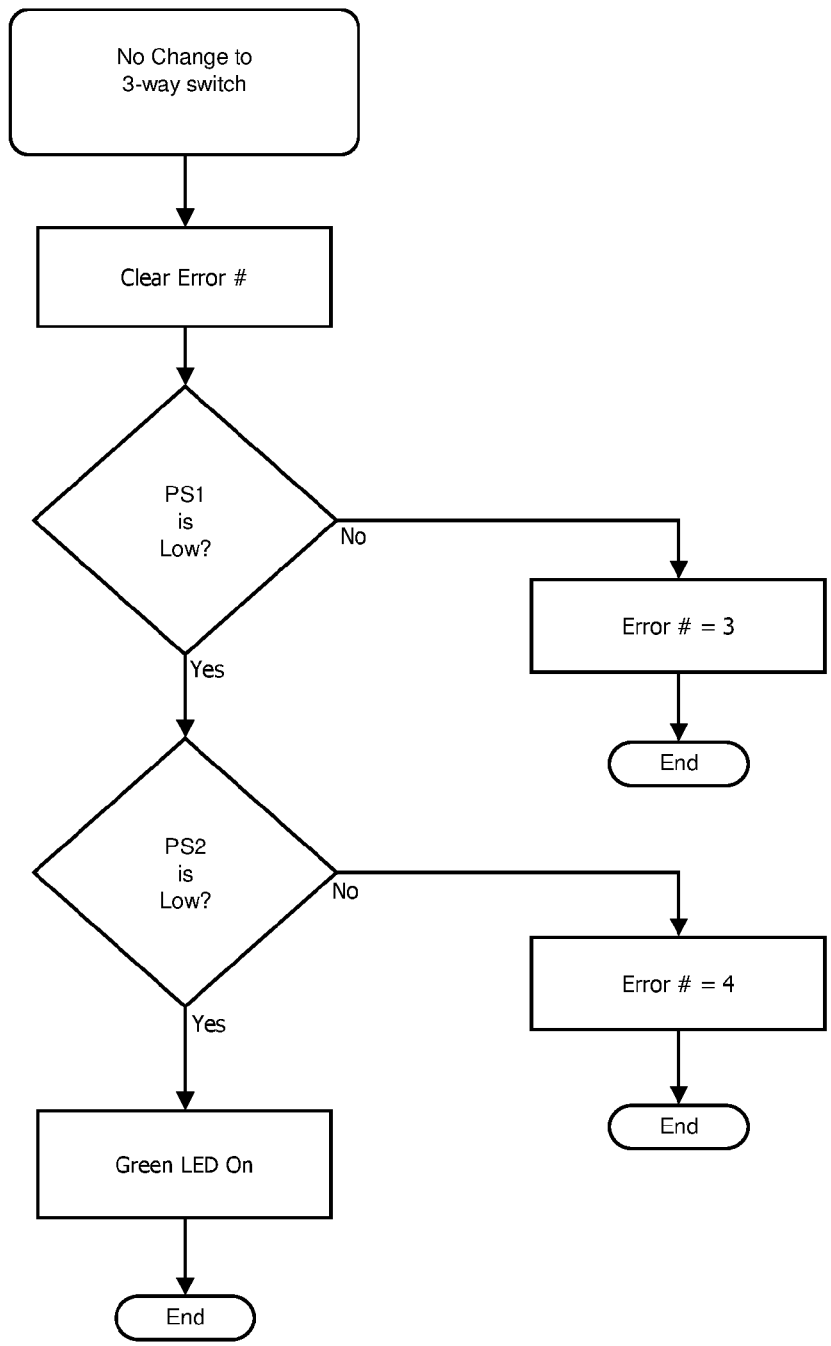
Figure 6E:
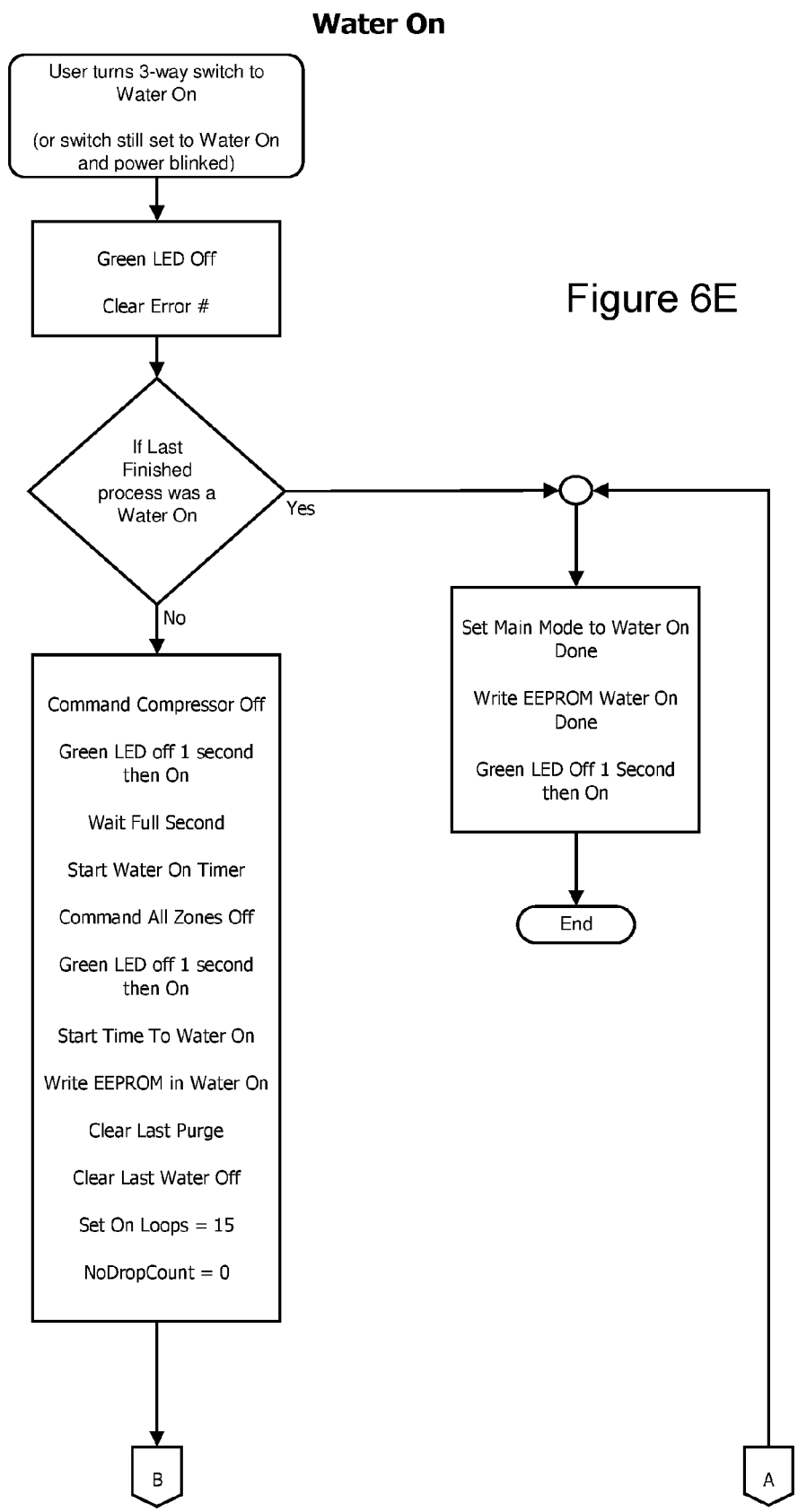
Figure 6F:
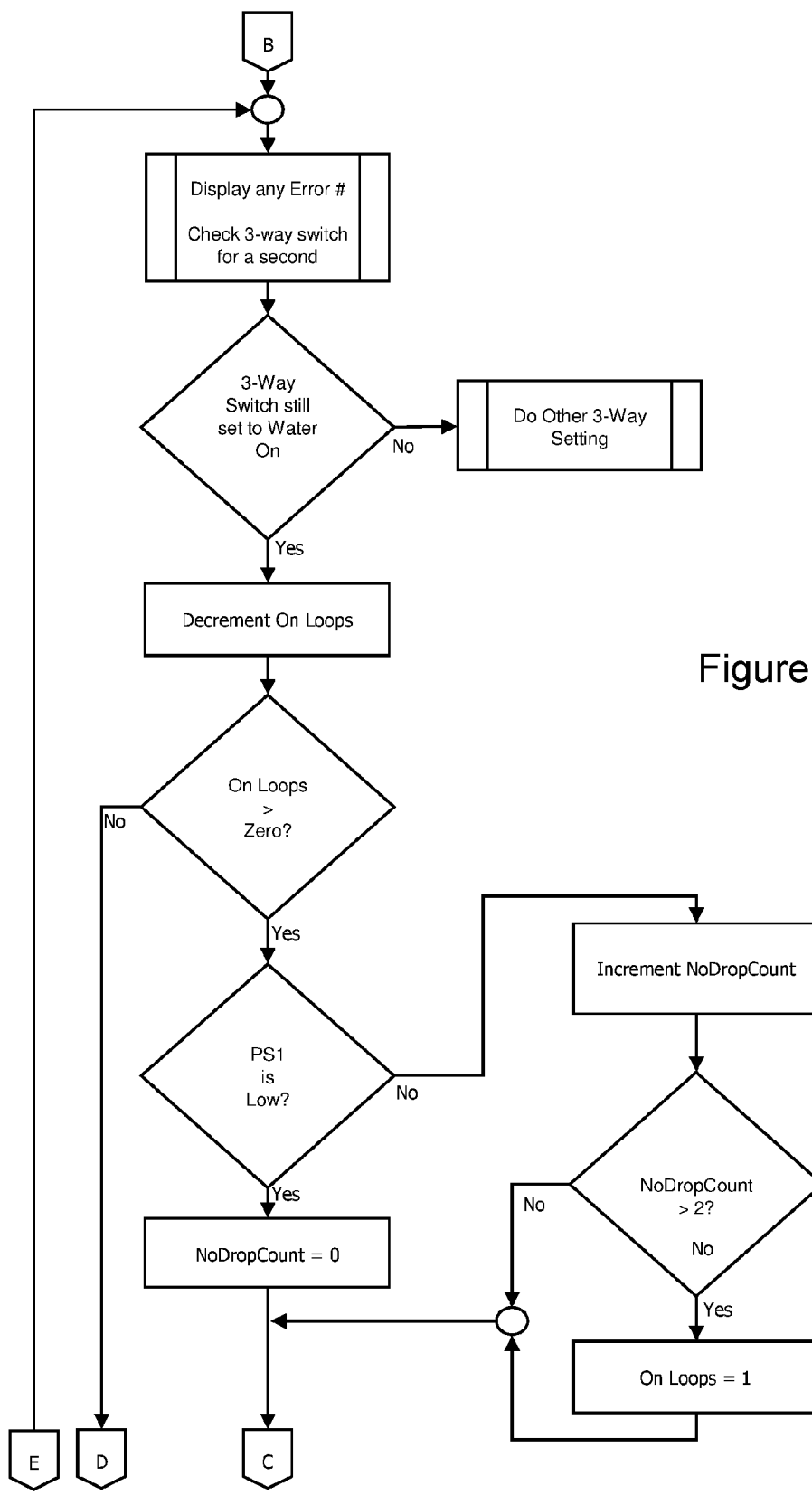
Figure 6G:
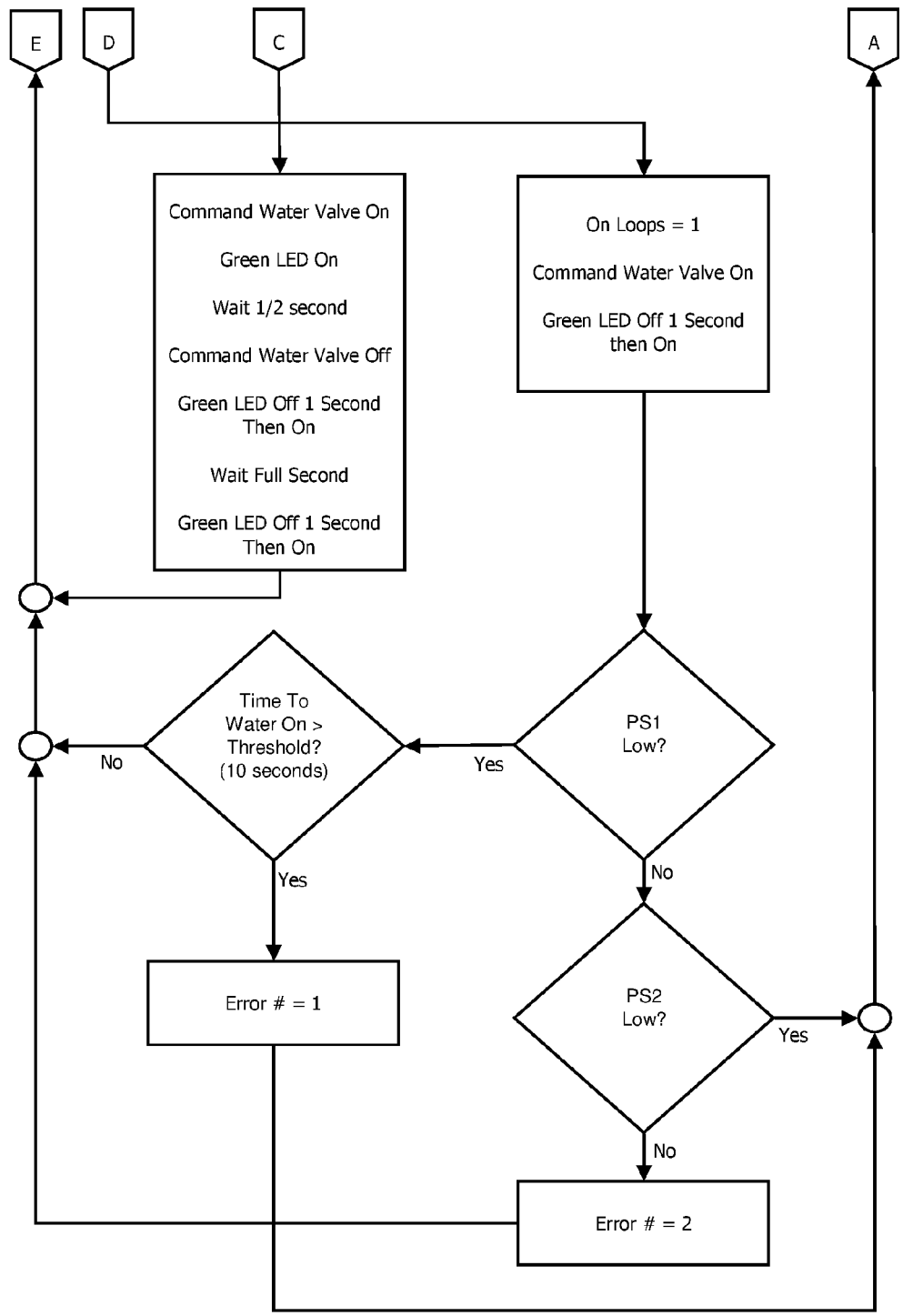
Figure 6H:
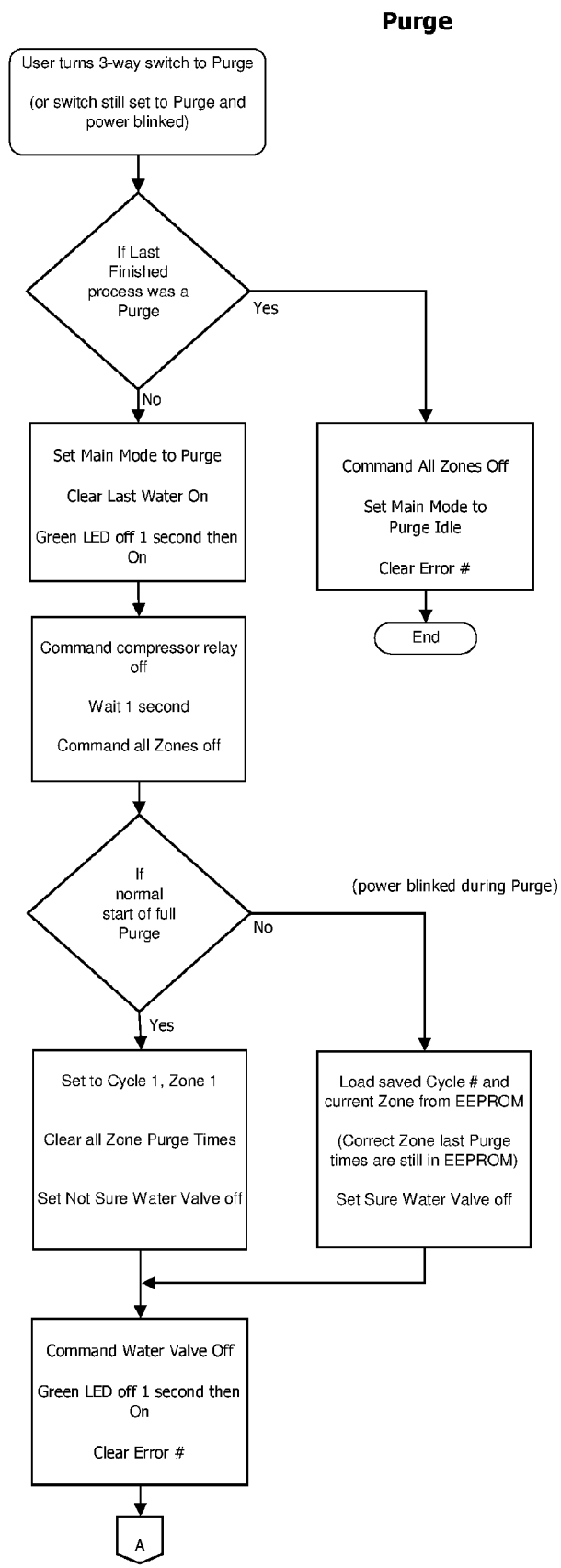
Figure 6I:
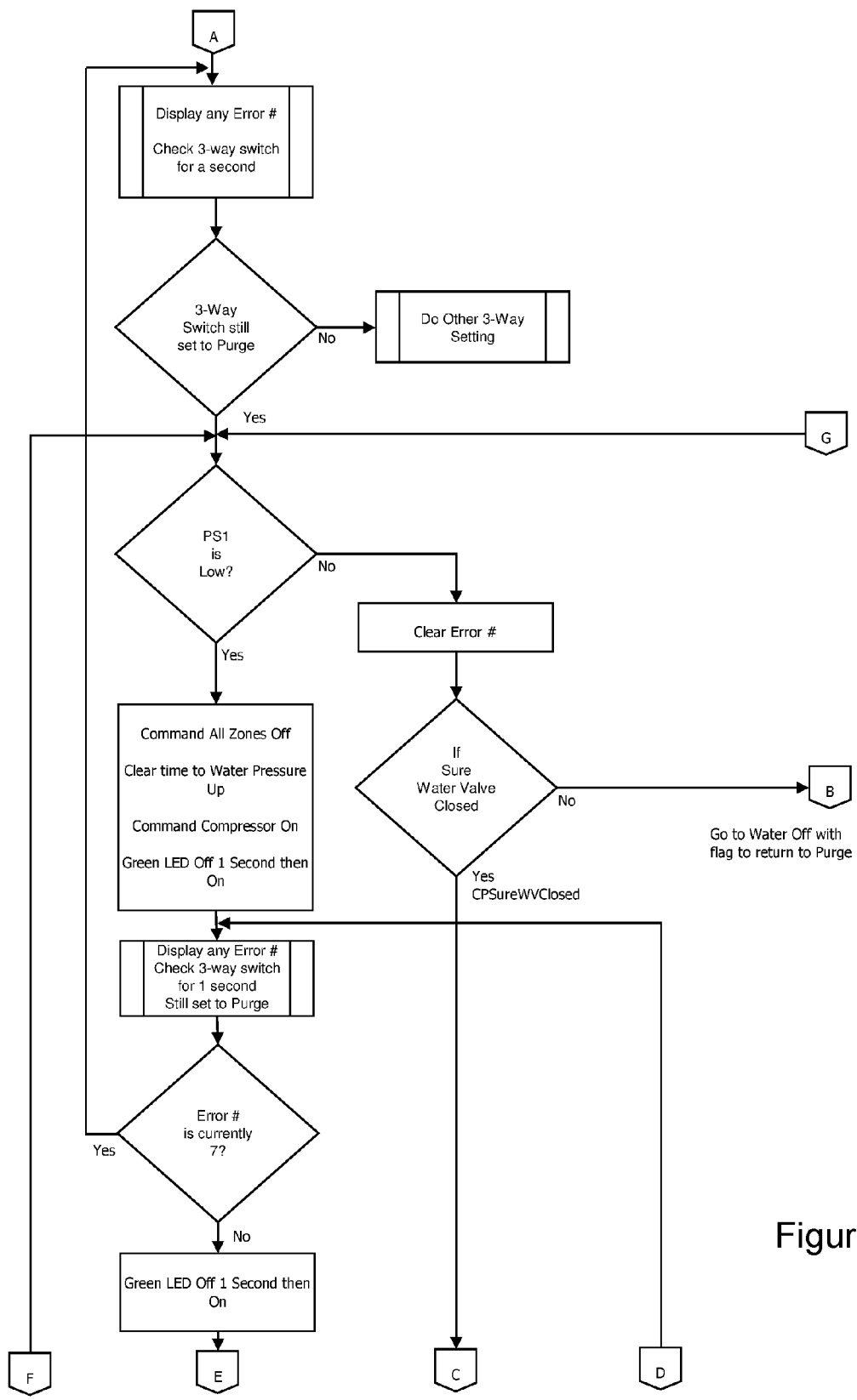
Figure 6J:
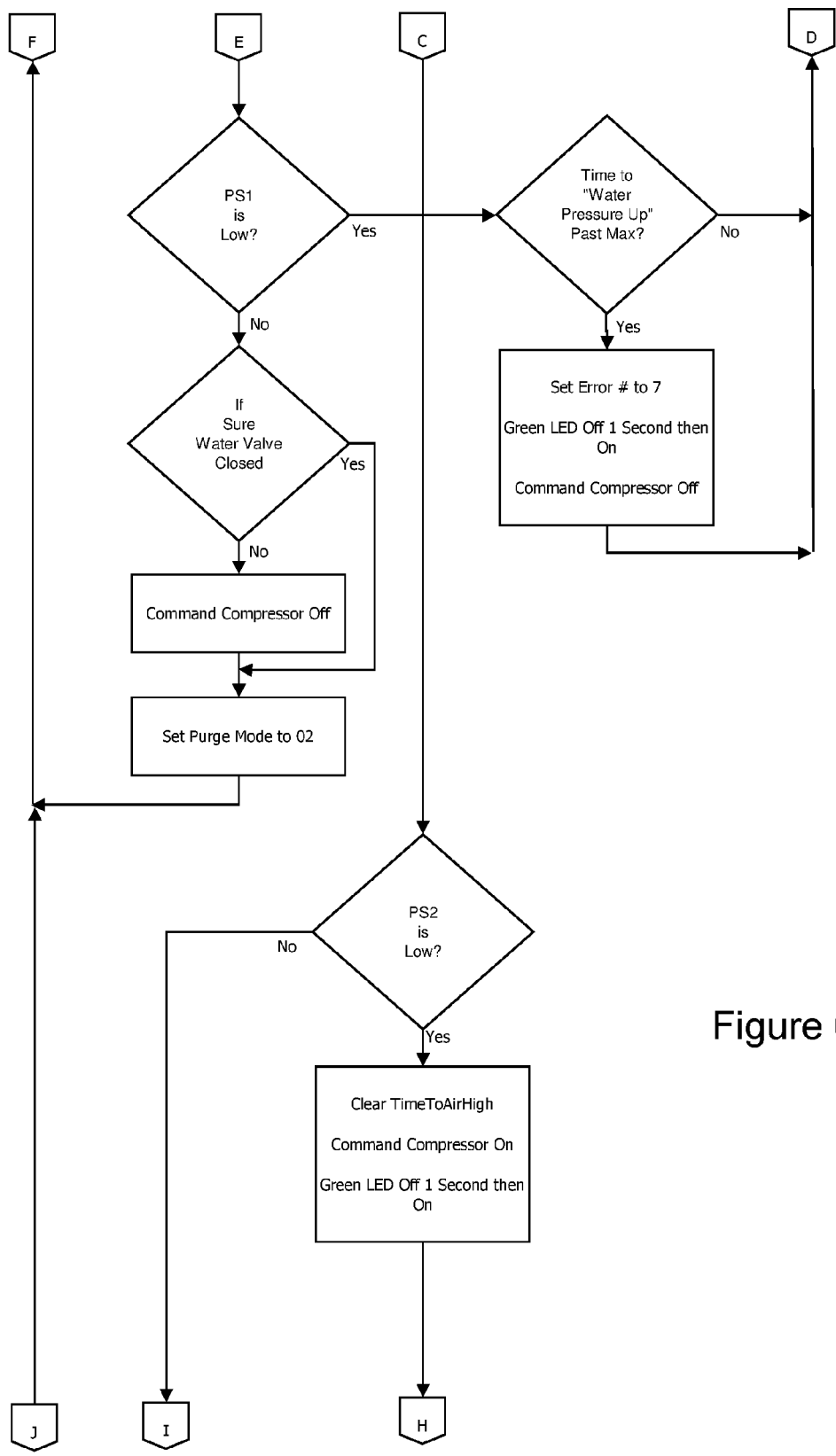
Figure 6K:
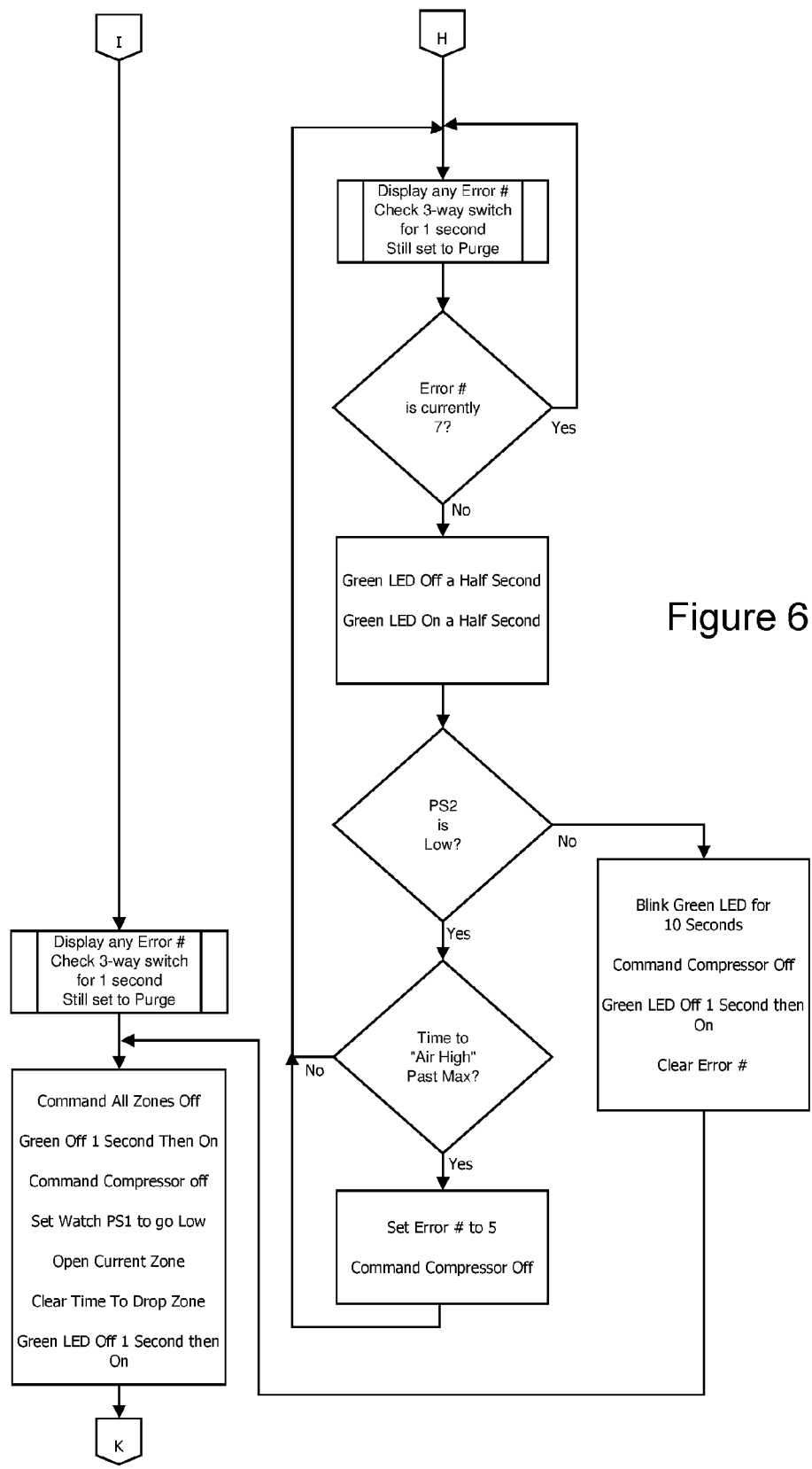
Figure 6L:
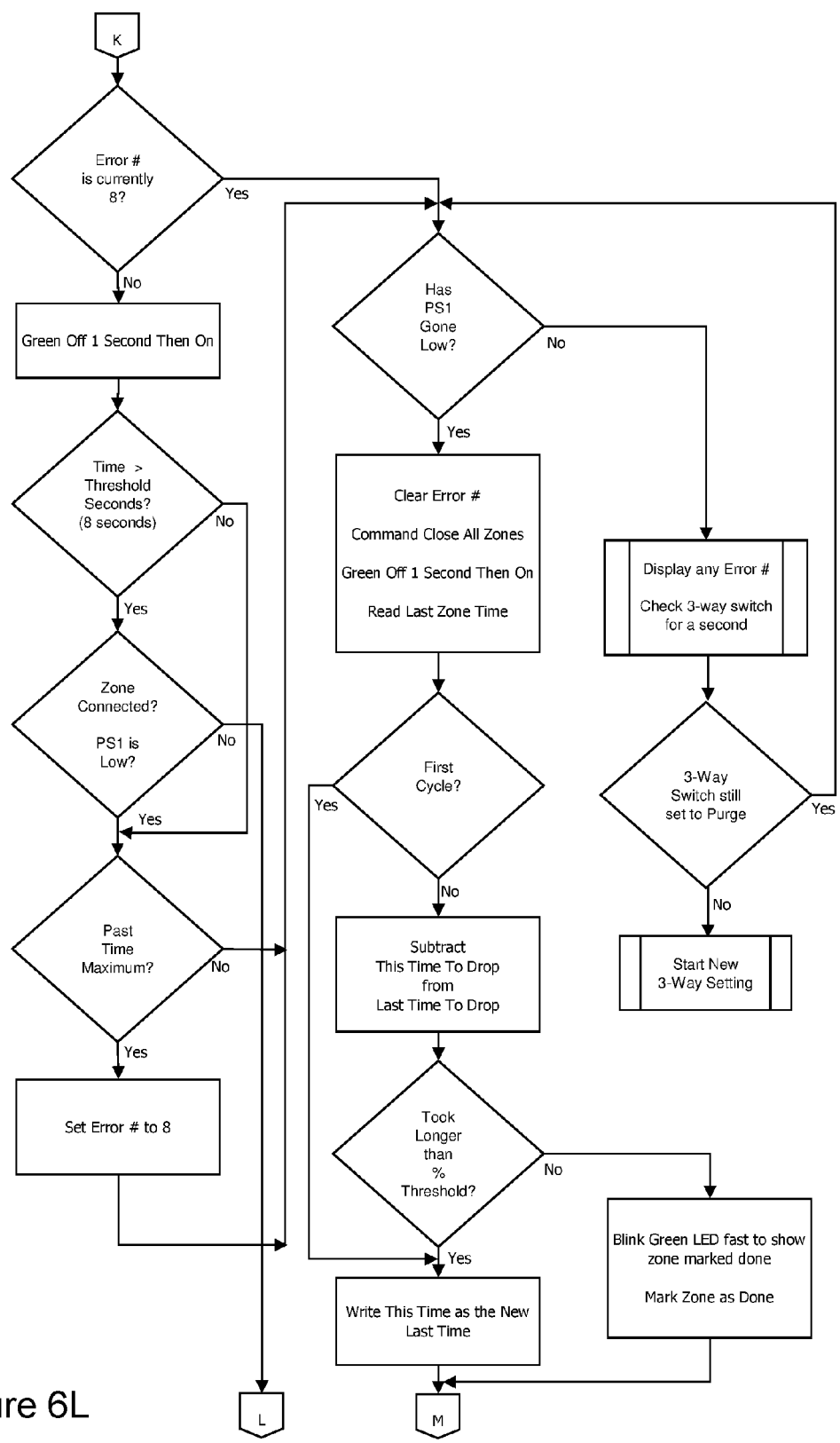
Figure 6M:
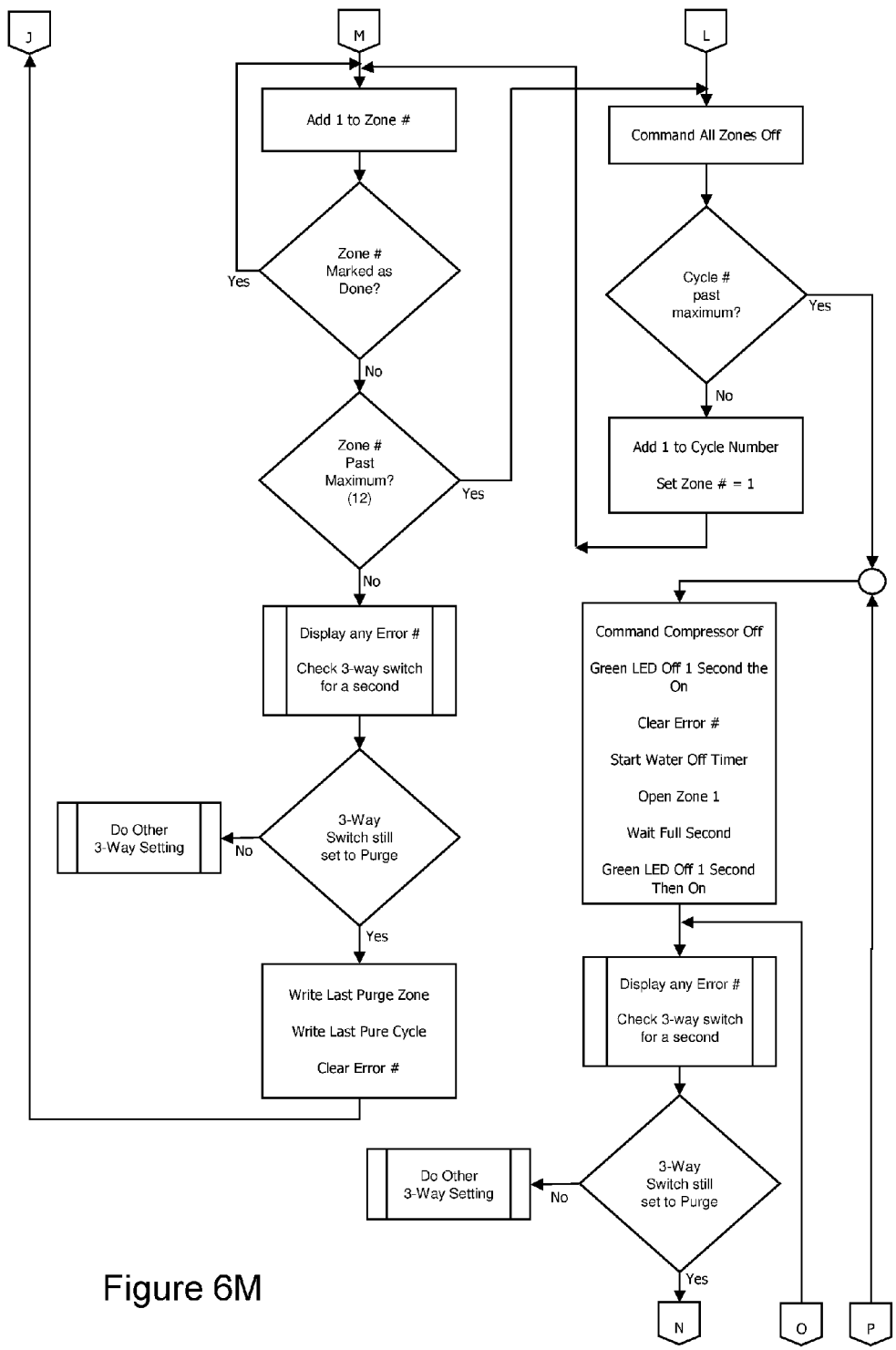
Figure 6N:
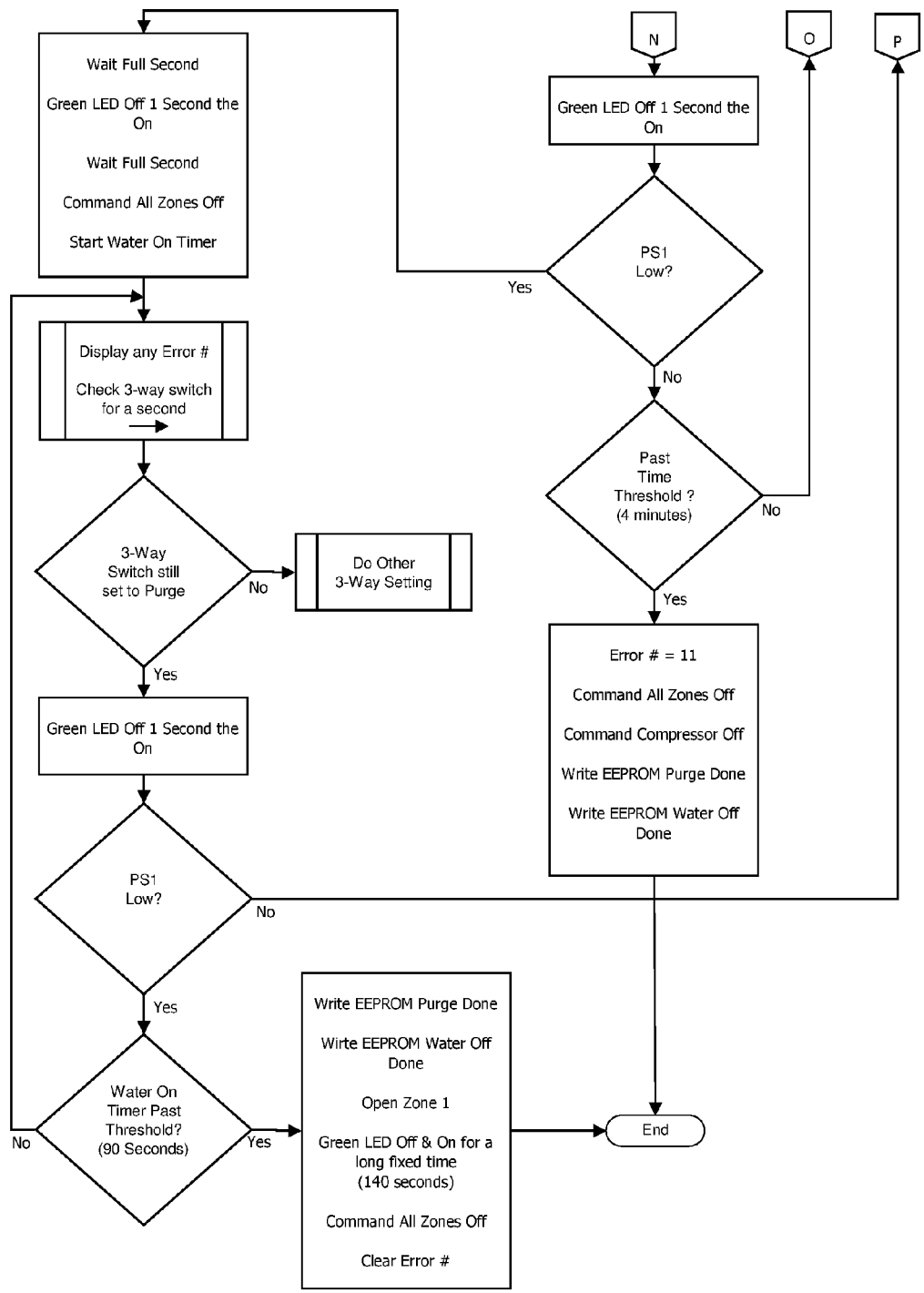

FIGS. 6C and 6D show the process Purge Controller 17 follows in detail when "Water On" is selected. One important action Purge Controller 17 takes is to cycle the water valve on and off several times in short intervals. This action slowly fills the irrigation system with water which in turn prevents water hammer from damaging valves, pipes, and pipe fittings.

When Purge Controller 17 is set to "Water Off," Purge Controller 17 turns off the air compressor 16, latching solenoid water valve 11, and all irrigation zone valves 26. FIGS. 6A and 6B show the process Purge Controller 17 follows in detail when "Water Off" is selected. For example, Purge Controller 17 will check the water pressure via low-pressure switch 12 to ensure that the water pressure drops after latching solenoid water valve 11 is closed and an irrigation zone valve 26 is opened, and provide an error signal if this doesn't occur.

Figure 3A:
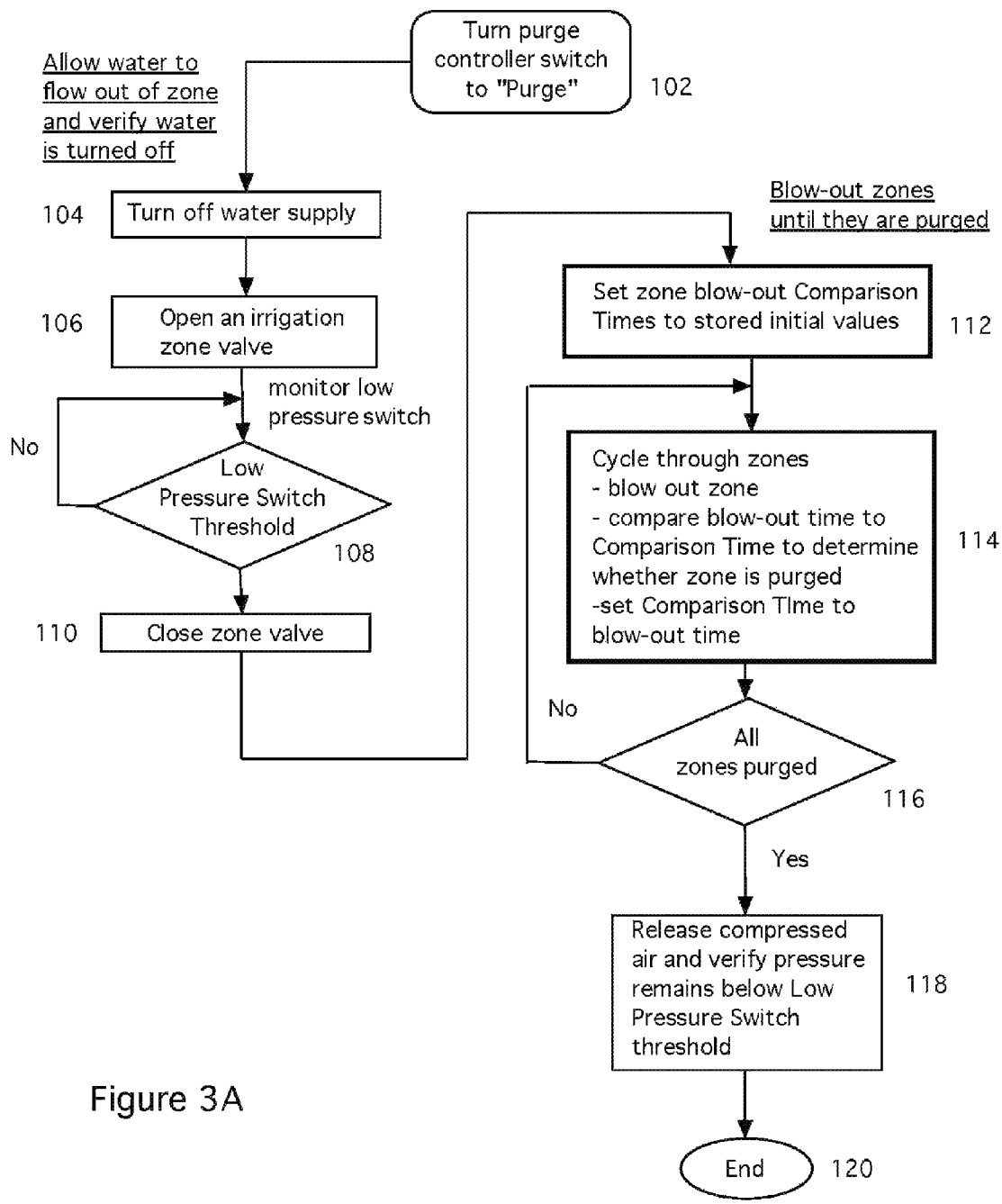
FIG. 3 includes FIGS. 3A and 3B comprising time flow diagrams illustrating a method of automatically purging an irrigation system according to the present invention.
Figure 3B:
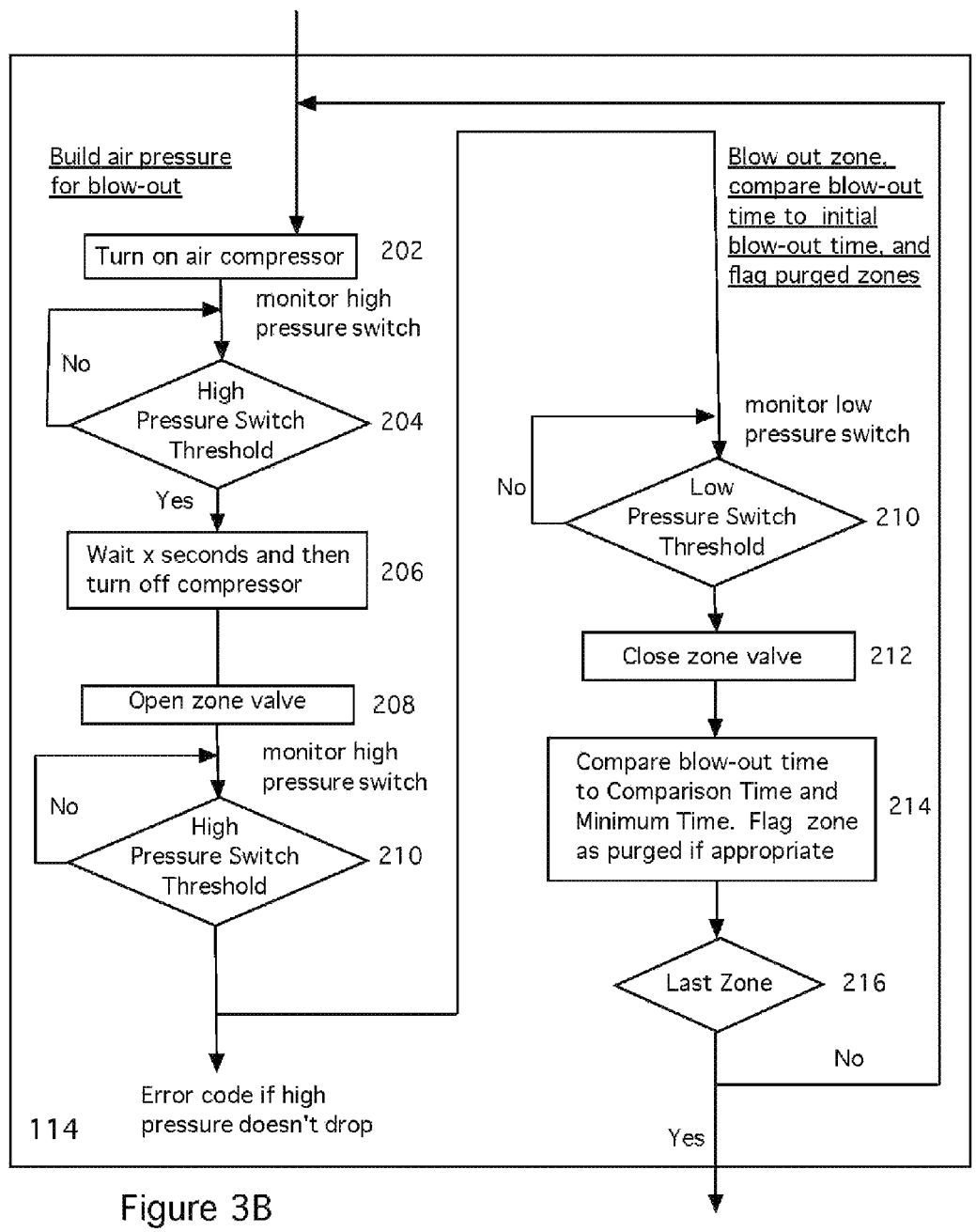

When selector 33 is set to "Purge," Purge Controller 17 can control irrigation zone valves 26. In general, irrigation controller 25 can still control irrigation valves 26 as well, although it may be desirable to lock-out irrigation controller 25 in some embodiments. FIGS. 3A and 3B show the purge process at a high level and FIGS. 6E-H show it in detail.

FIGS. 3A and 3B are high level time flow diagrams illustrating a method of automatically purging an irrigation system according to the present invention. FIG. 3A illustrates the overall method. The operator starts the purge process, for example by turning purge controller selector 33 from either "Water On" or "Water Off" to "Purge" (step 102). Purge Controller 17 turns off the water supply (step 104) by closing latching solenoid water valve 11. As an alternative, the operator may shut off the water manually using manual water valve with drain port 19 before selecting "Purge".

Next, the system allows water to flow out of a zone and verifies that the water is turned off. Purge Controller 17 opens a zone valve 26 (step 106) to allow water to flow out and existing water pressure to drop. Purge Controller 17 monitors low-pressure switch 12 to ensure that the water pressure drops sufficiently to ensure that the water supply is indeed turned off (step 108). Purge Controller 17 then closes the open zone valve (step 110).

The system blows out a zone several times, or cycles. When a zone is sufficiently cleared of water, it is considered purged. The system ensures that a zone is purged by comparing the amount of time it took to blow-out a zone to a Pressure Transition Time Value. Before the purge process starts, Purge Controller 17 sets the Pressure Transition Time Value to a selected reference time (step 112). As an example, the starting Pressure Transition Time Value (for the first blow-out cycle) might be set to 0 to indicate this is the first blow-out cycle and no comparison can take place. As an alternative, the starting Pressure Transition Time Value might be set to a reference time such as 10 seconds. This is the Pressure Transition Time Value used in the first blow-out cycle through the zones. After that, the last pressure transition time for each zone is used to calculate the new Pressure Transition Time Value for that zone (step 114, detailed in FIG. 3B). When all the zones have been purged (step 116) the process is completed in step 118 by turning off air compressor 16, releasing remaining compressed air in the air reservoir 15, and verifying that the pressure remains below the low-pressure switch 12 threshold, showing that air pressure to the system has been eliminated. The process ends at 120.

FIG. 3B is a flow diagram detailing the processes performed in step 114. For the selected zone, Purge Controller 17 turns on air compressor 16 (step 202) and monitors the high-pressure switch 14. When the high-pressure switch threshold is reached, Purge Controller 17 allows pressure to build up for a few more seconds and then turns off the air compressor 16 (step 206) and is then ready to blow-out a zone.

Purge Controller 17 opens irrigation zone valve 26 for the selected zone (step 208) and monitors first the high-pressure switch 14 (step 210) and then the low-pressure switch 12 (step 210) to determine when the pressure has dropped sufficiently. At that point, the zone valve is closed (step 212) and the blow-out time is noted. If the blow-out time is either below a designated minimum time or within a defined margin of the Comparison Time, the zone is marked as sufficiently purged and is skipped during the next blow-out cycle.

As a feature, the system may provide error notifications to the system (and the user if desired) when events do not proceed as planned. For example, in step 210, if the low-pressure switch 12 threshold is not reached within a certain amount of time after the zone vale is opened, an error code can be provided indicating that something is wrong with the zone (e.g. a pipe is blocked, or the zone does not exist). Table 2, below indicates examples of codes that may be provided by the system to the user, using red LED 32. FIGS. 6A-H show how these error codes are assigned and how they might be used to monitor the state of the irrigation system in more detail.

TABLE 2

| Number of Blinks (red LED 32) | Error detected |
|---|---|
| 1 | Latching Solenoid Water Valve 11 is on but low-pressure switch 12 stays low detecting the lack of water pressure (indicates a defective latching solenoid water valve, a defective low-pressure switch 12, a leak, or water turned off at some other point). |
| 2 | Latching Solenoid Water Valve 11 is on and low-pressure switch 12 is on but high-pressure switch is on detecting presence of high air pressure and the air pressure is not needed (indicates air reservoir 15 was connected with pressure already present or defective high-pressure switch 14). |
| 3 | Latching Solenoid Water Valve 11 is off but low-pressure switch is high detecting the presence of water pressure (indicates Latching Solenoid Water Valve 11 is defective, inoperable, manually turned on, or a leak into the system or defective low-pressure switch 12). |
| 4 | Latching Solenoid Water Valve 11 is off and low-pressure switch is low, but high-pressure switch 14 is on, detecting the presence of air pressure that is not needed (indicates the air reservoir was connected with pressure already present or defective high-pressure switch 14). |
| 5 | System attempted to purge but air pressure didn't build fast enough, low-pressure switch is on but high-pressure switch is off and did not close in time (indicates a problem with air compressor 16 or an air leak or defective high-pressure switch 14). |
| 6 | Not assigned |
| 7 | Attempted to purge but air pressure remains low and did not build fast enough, low-pressure switch 12 is off and high-pressure switch 14 is off (indicates that air is leaking in the zone, an irrigation zone valve 16 failed to close, irrigation controller 25 has opened an irrigation zone valve 26, or the back flow check valve 23 dropped open). |
| 8 | Attempted to purge but air pressure does not drop quick enough, high-pressure switch 14 is off and low-pressure switch 12 is on and did not transition in time (indicates a clog or restriction in the zone, an irrigation zone valve 26 closed unexpectedly that allowed enough air to escape to turn off high-pressure switch 14 but not enough air to escape |

TABLE 2-continued

| Number of Blinks (red LED 32) | Error detected |
|---|---|
| | to turn off low-pressure switch 12, or defective low-pressure switch 12). |
| 9 | Not assigned |
| 10 | Not assigned |
| 11 | Internal use |

The error detection capability of some embodiments may be used for purposes beyond detecting a problem during normal operation. A user may do system testing deliberately. For example, a user may detect a leak in the irrigation hardware by turning the purge controller selector switch 33 to "Water On", waiting for the water pressure to rise and achieving a solid green OK LED, then turning the water off manually using Manual Water Valve 19 and determining how long it takes for water pressure to subside again when the red error code 1 appears. The faster the drop in pressure the larger the leak.

Figure 4:
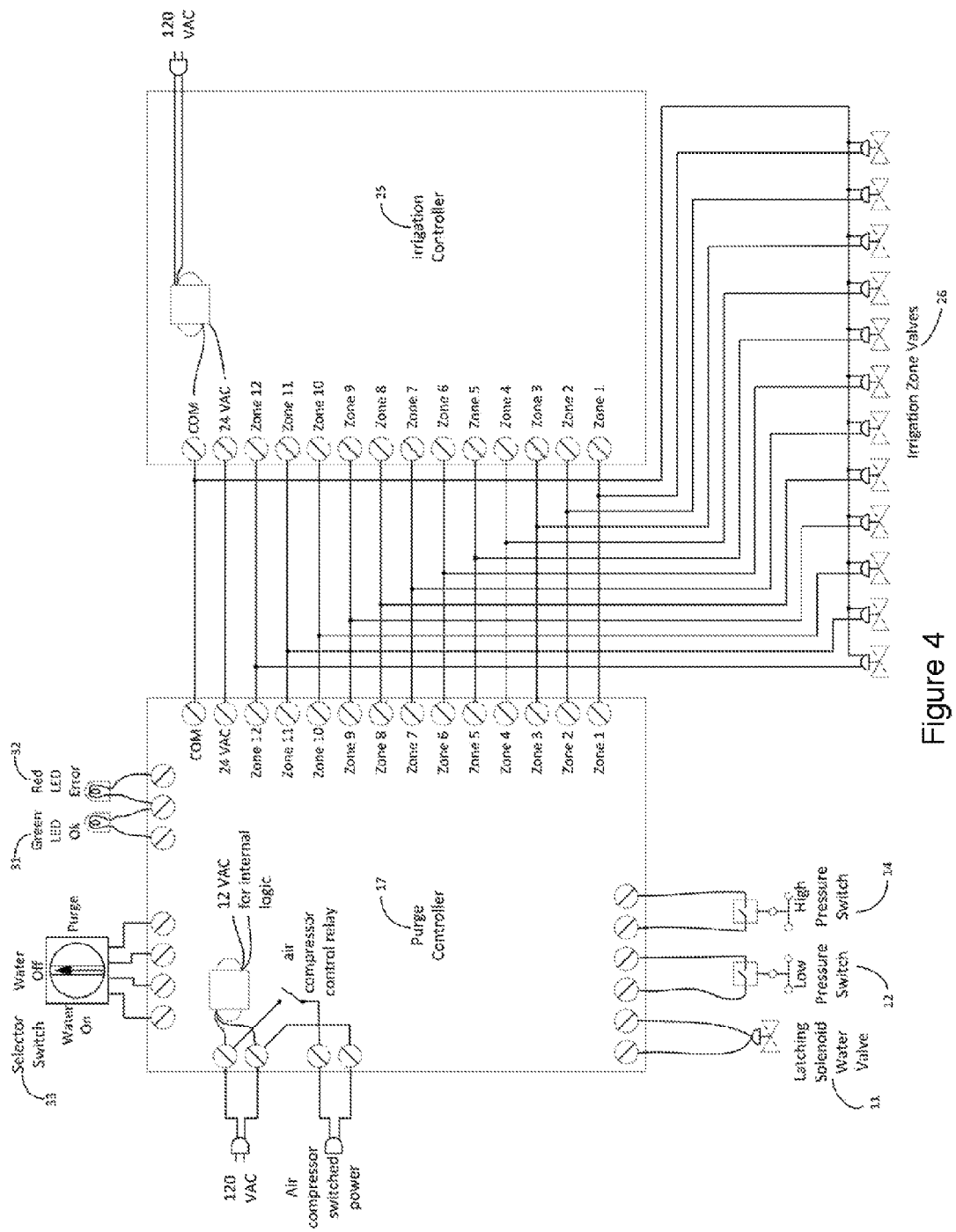
FIG. 4 is an electrical block diagram illustrating control and information flow between automatic purging apparatus according to the present invention and a typical irrigation system.
Figure 5A:
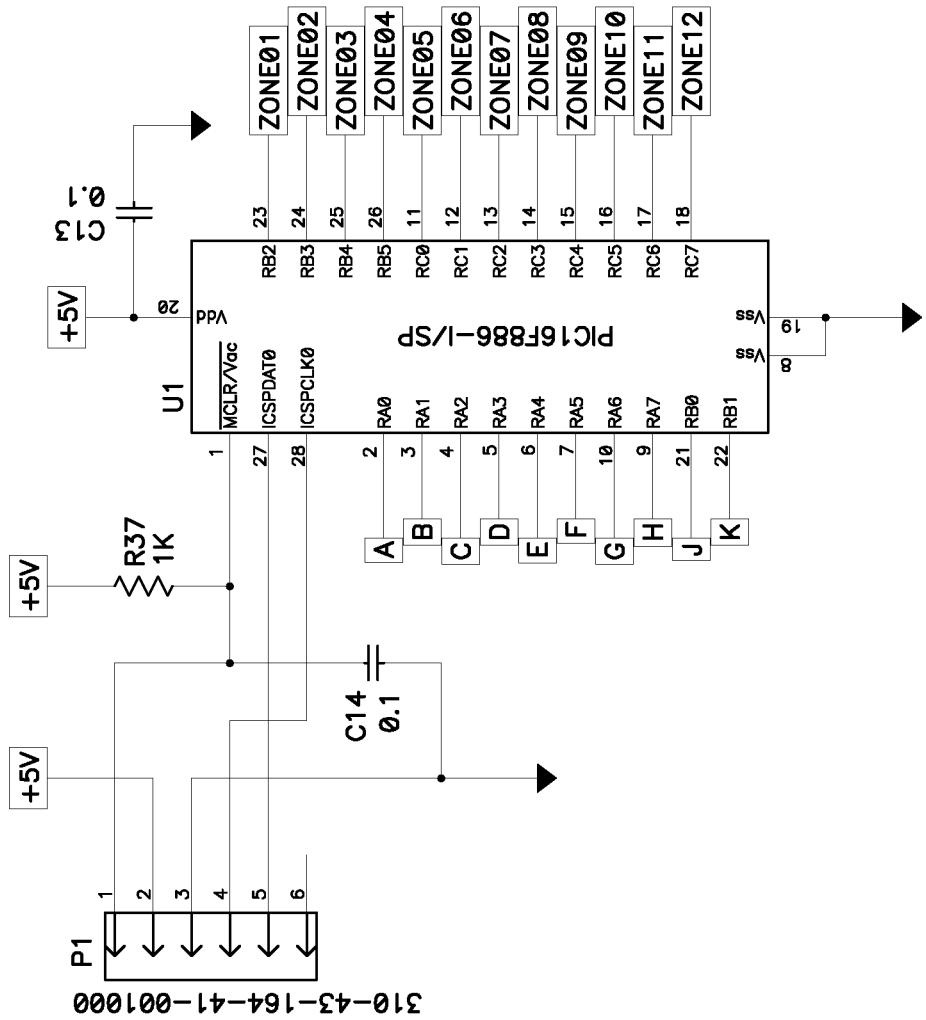
FIG. 5 comprises FIGS. 5A-5G and shows an example circuit diagram of automatic purging apparatus according to the present invention.
Figure 5B:
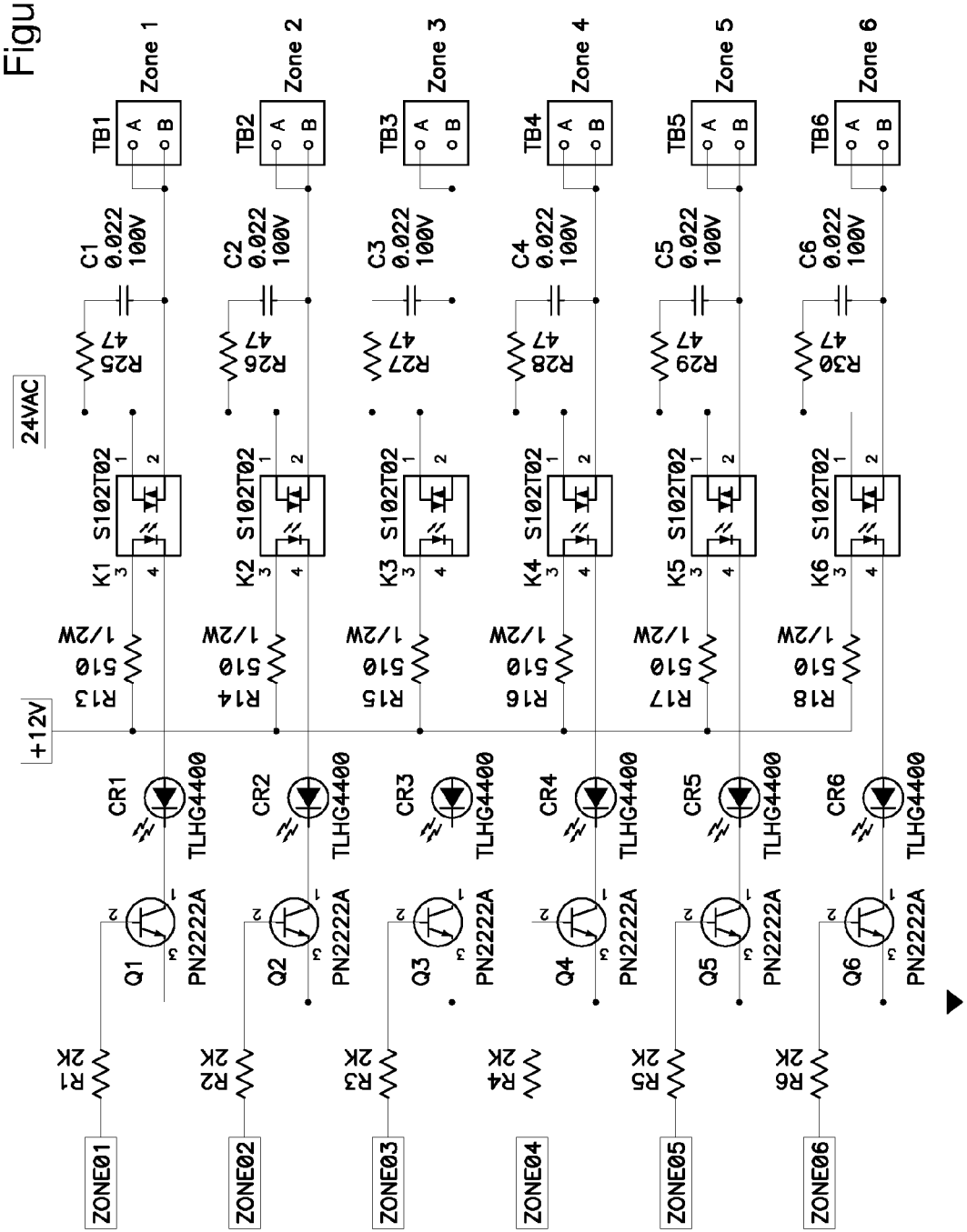
Figure 5C:
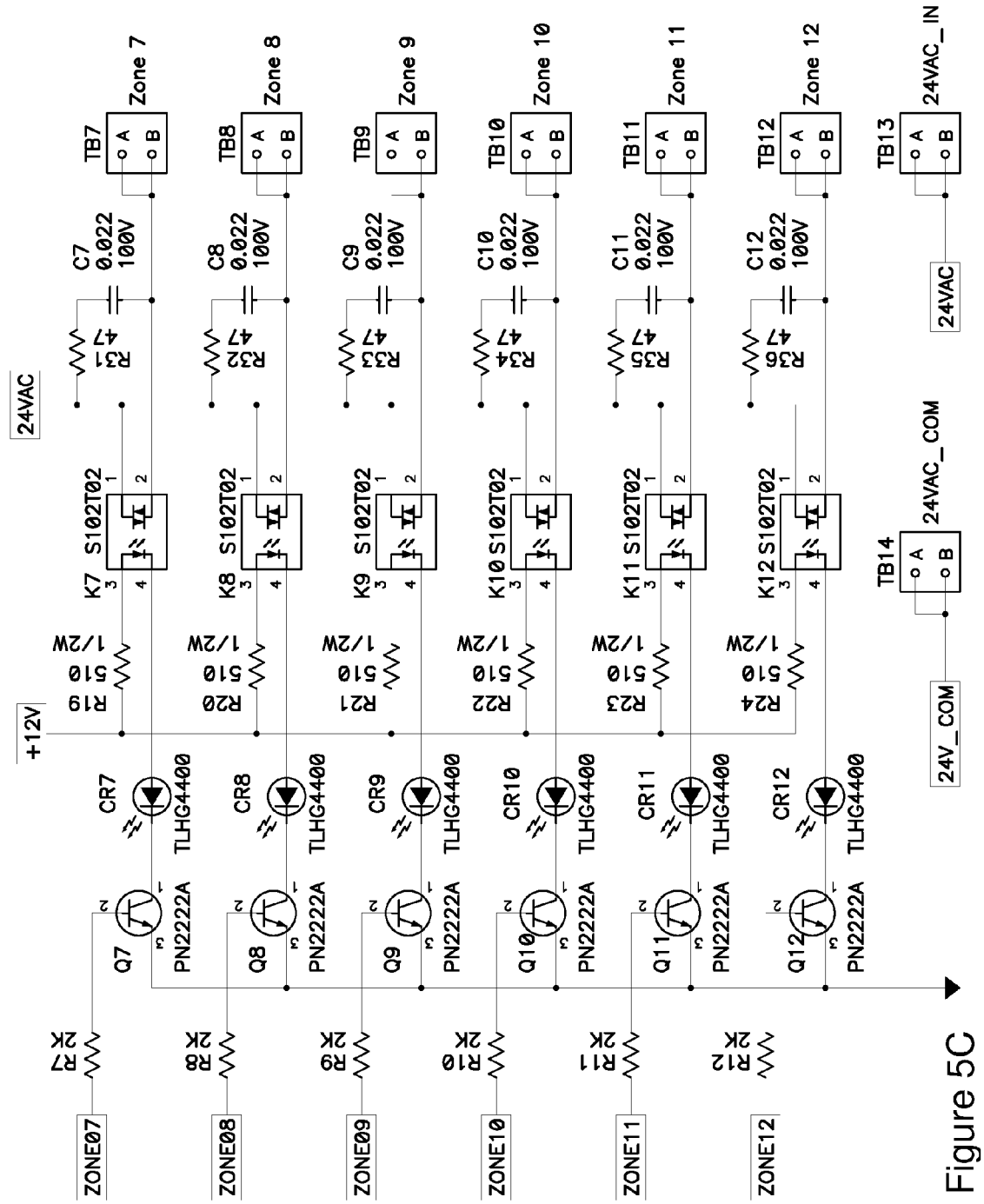
Figure 5D:
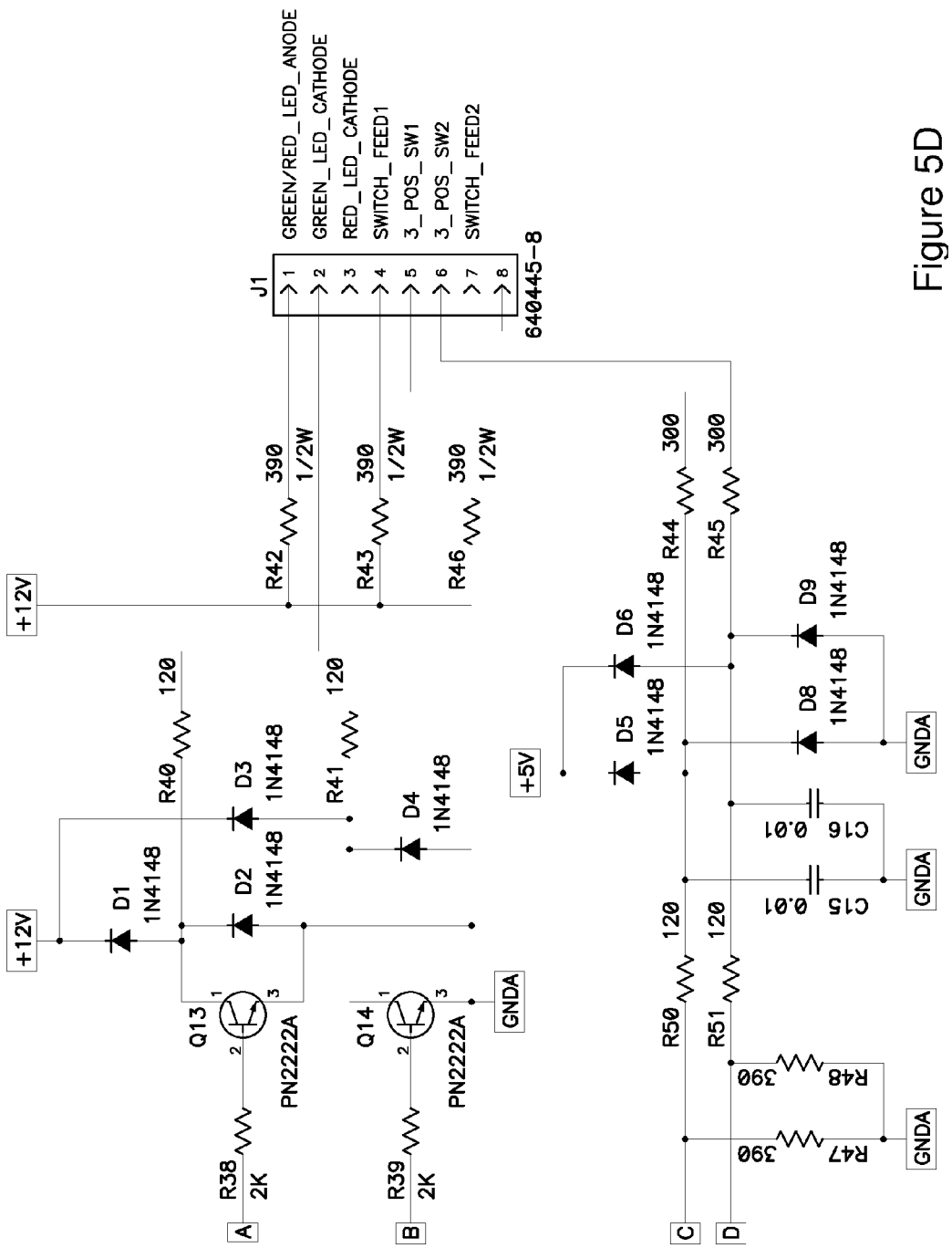
Figure 5E:
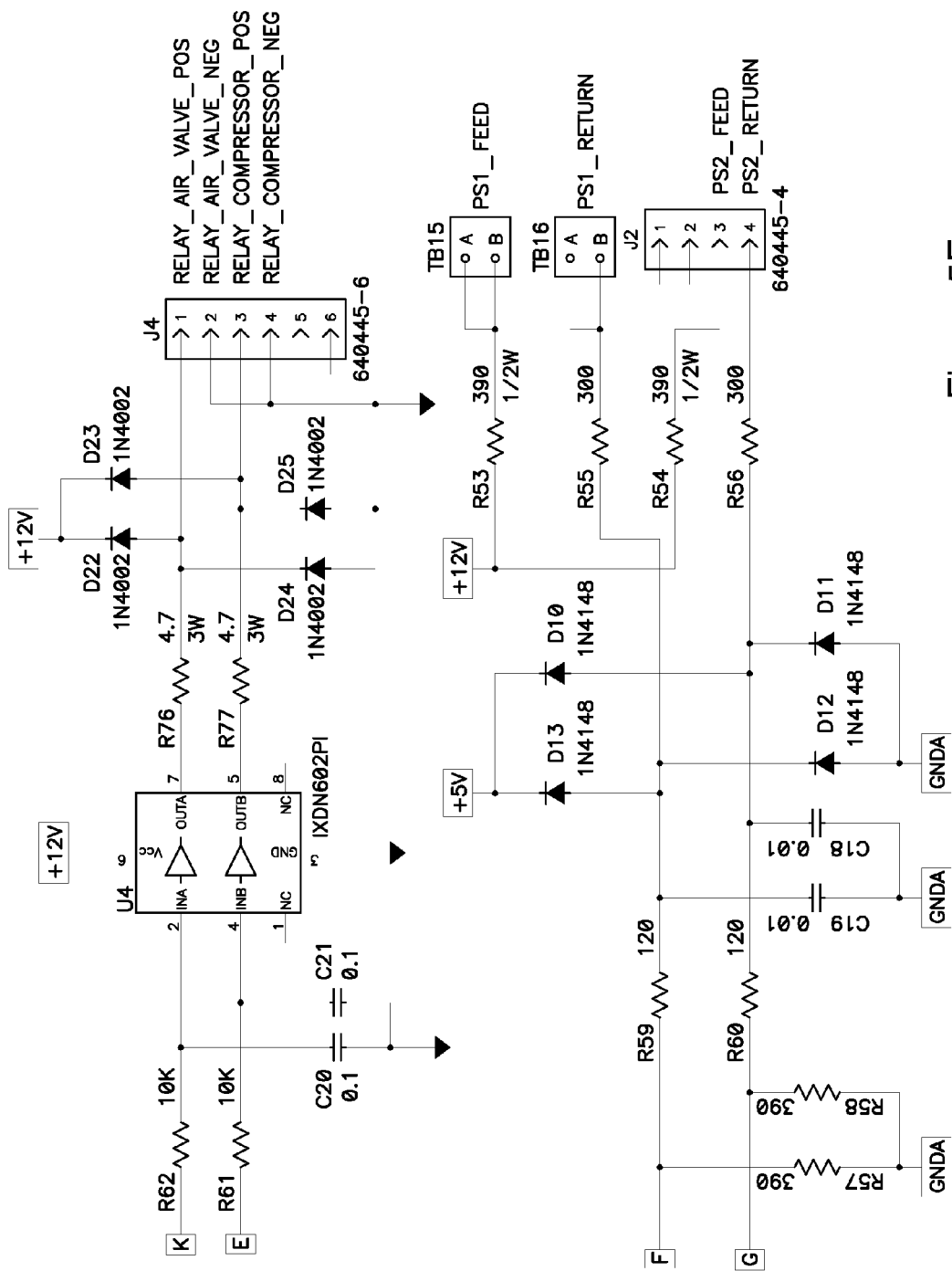
Figure 5F:
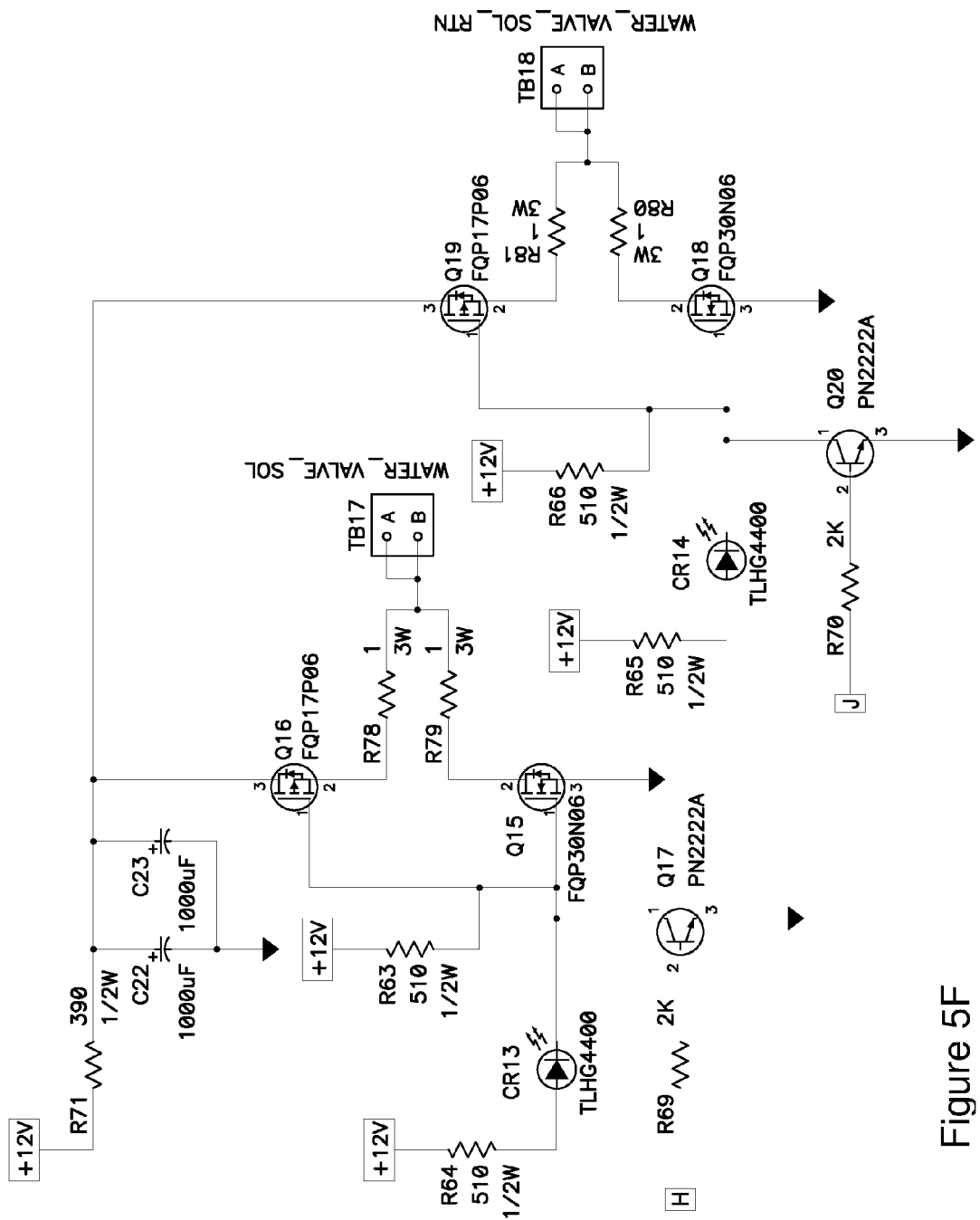
Figure 5G:
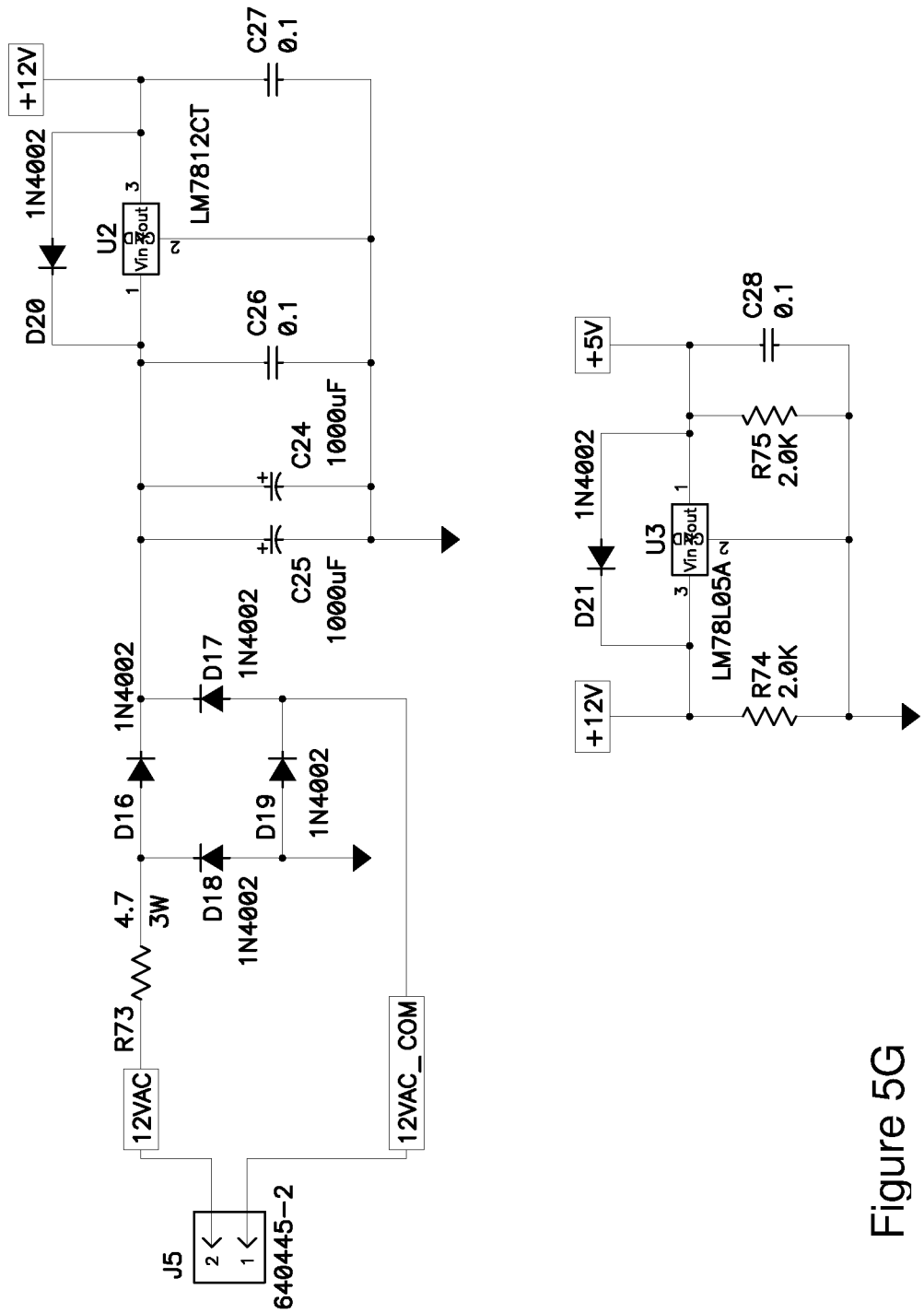

FIG. 4 is an electrical block diagram illustrating control and information flow between automatic purging apparatus according to the present invention and a typical irrigation system. Purge controller 17 includes selector switch 33. It controls air compressor 16, LEDs 31 and 32, and latching solenoid water valve 11. It shares control of irrigation zone valves 26 as described previously. It monitors low-pressure switch 12 and high-pressure switch 14. Irrigation controller 25 could be one of many commercially available irrigation systems. In the embodiment of FIG. 4, irrigation controller 25 provides 24 VAC power to Purge Controller 17. In alternative embodiments, irrigation controller 25 could be integrated within Purge Controller 17, or Purge Controller 17 and irrigation controller 25 could be integrated together, eliminating the need to provide separate 120 VAC power to each controller and to connect the controllers with an external cable 40.

FIG. 5 comprises FIGS. 5A-5G and shows an example circuit diagram of automatic purging apparatus according to the present invention.

Figure 6O:
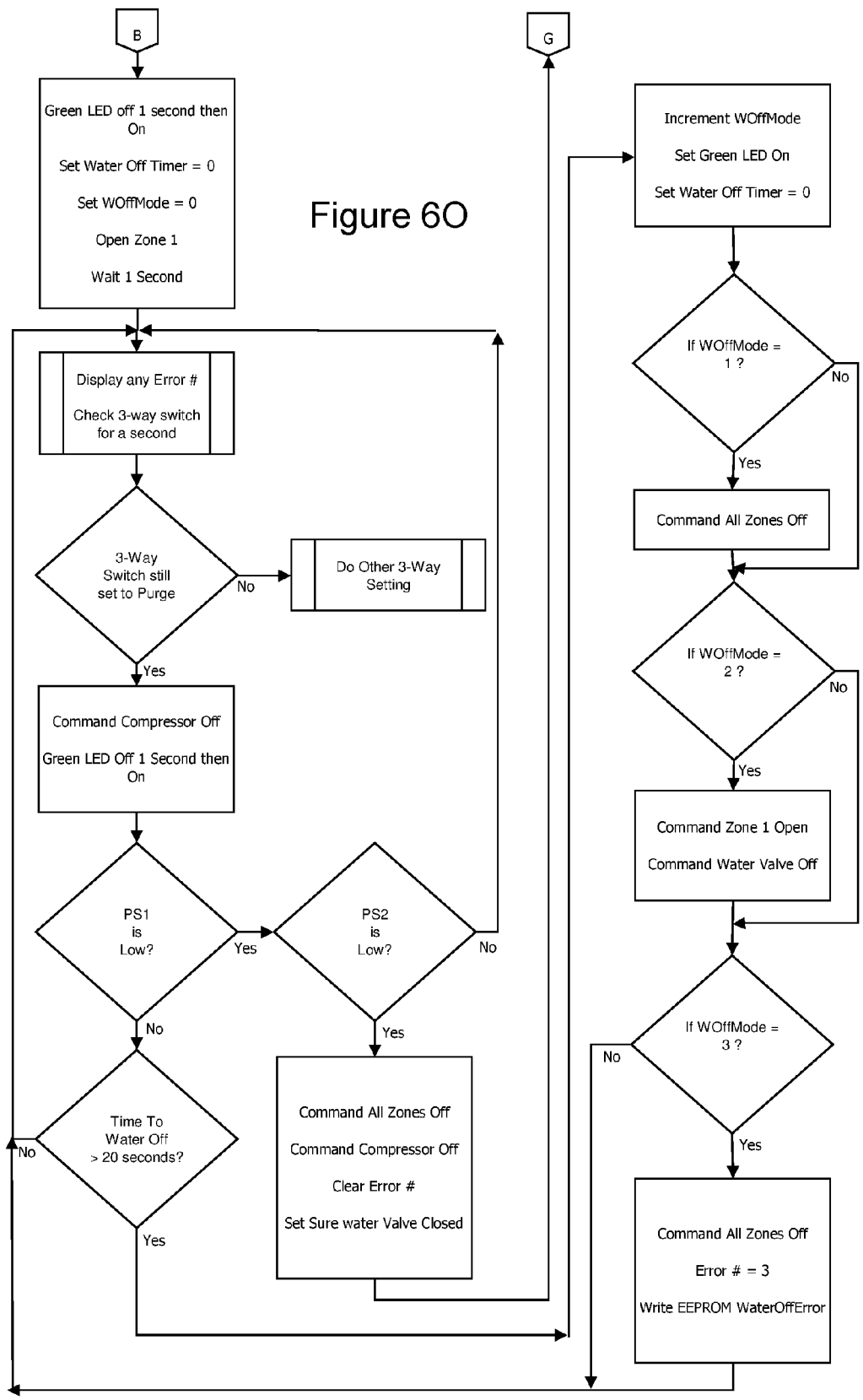
Figure 7A:
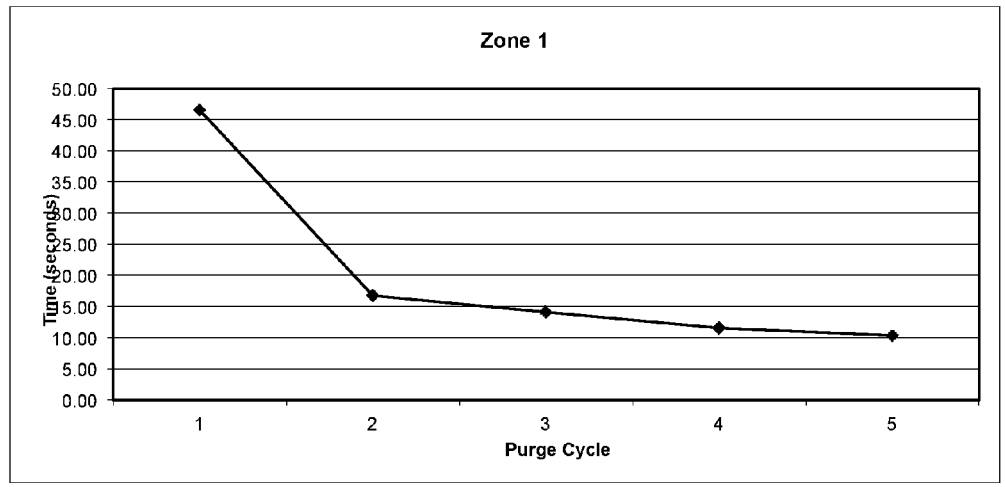
FIG. 7 comprises FIGS. 7A-7G, comprising plots illustrating experimental data gathered with apparatus and methods according to the present invention.
Figure 7B:
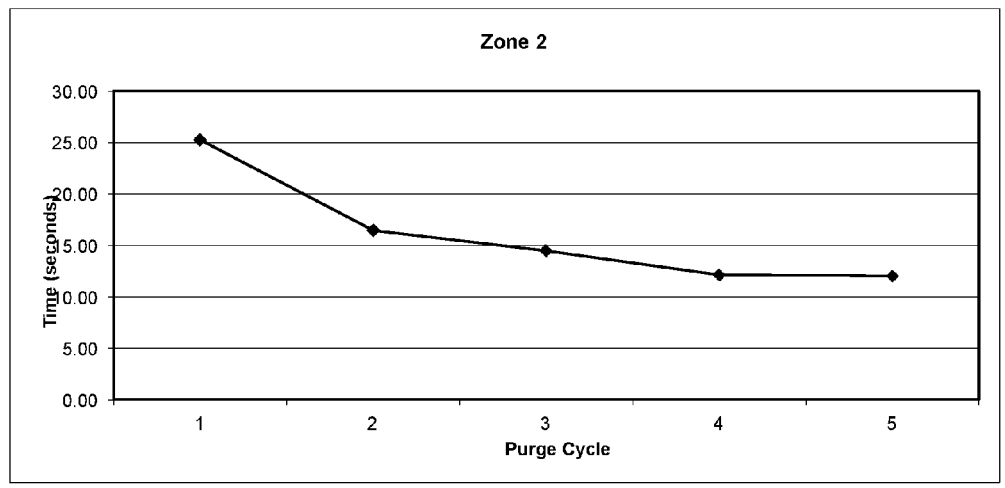
Figure 7C:
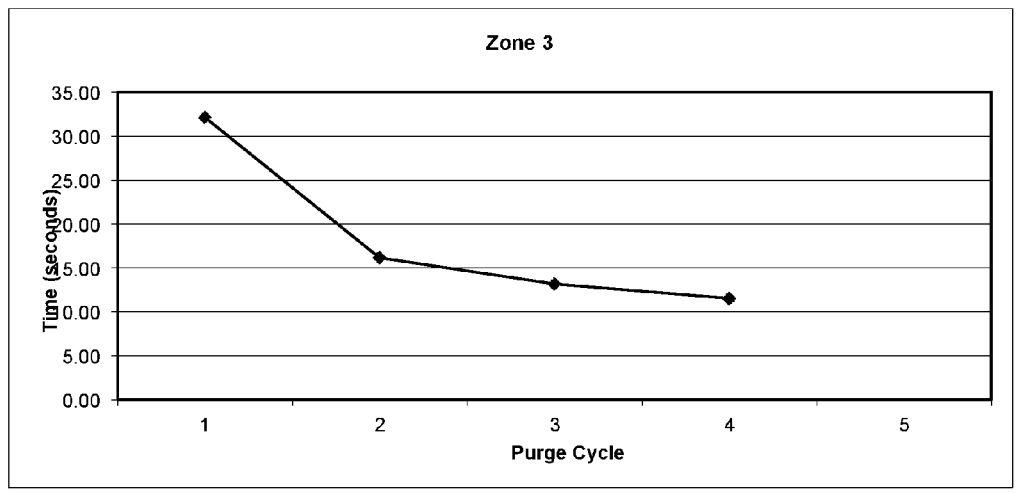
Figure 7D:
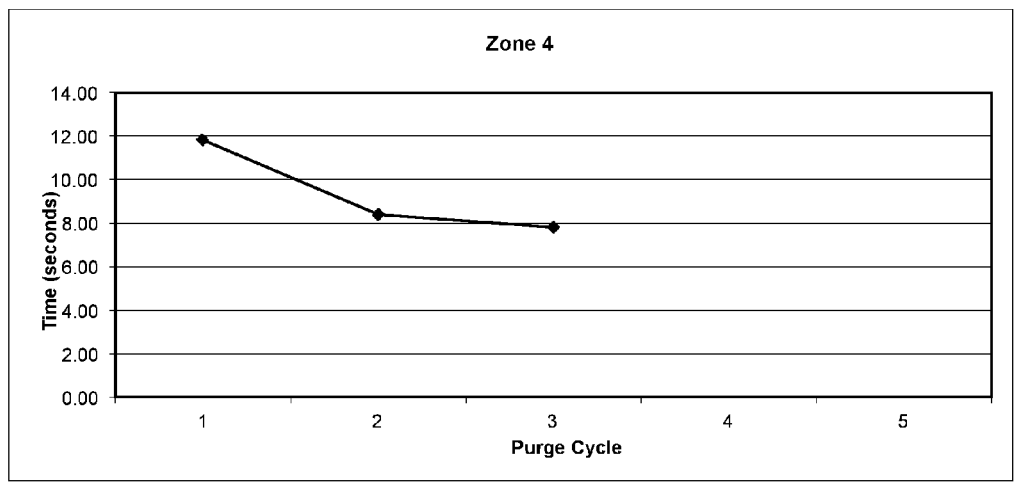
Figure 7E:
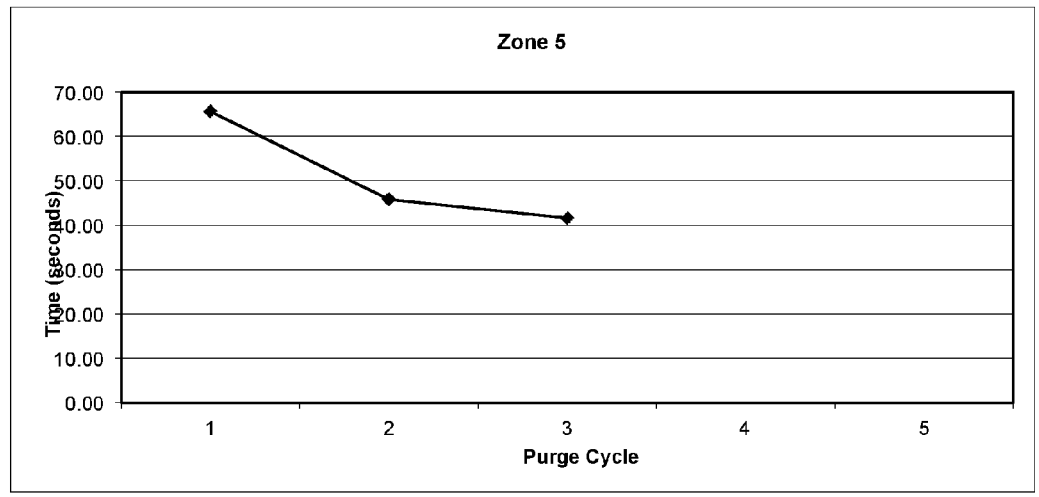
Figure 7F:
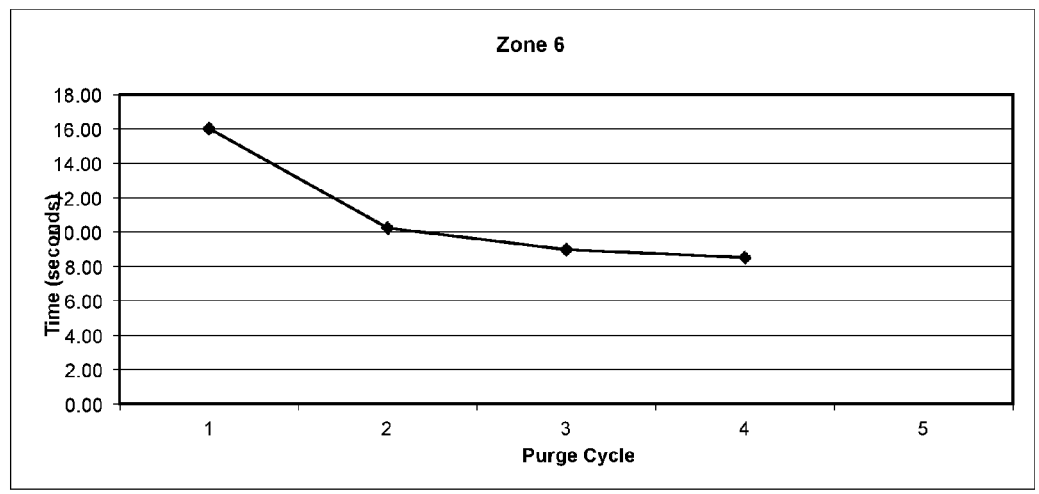
Figure 7G:
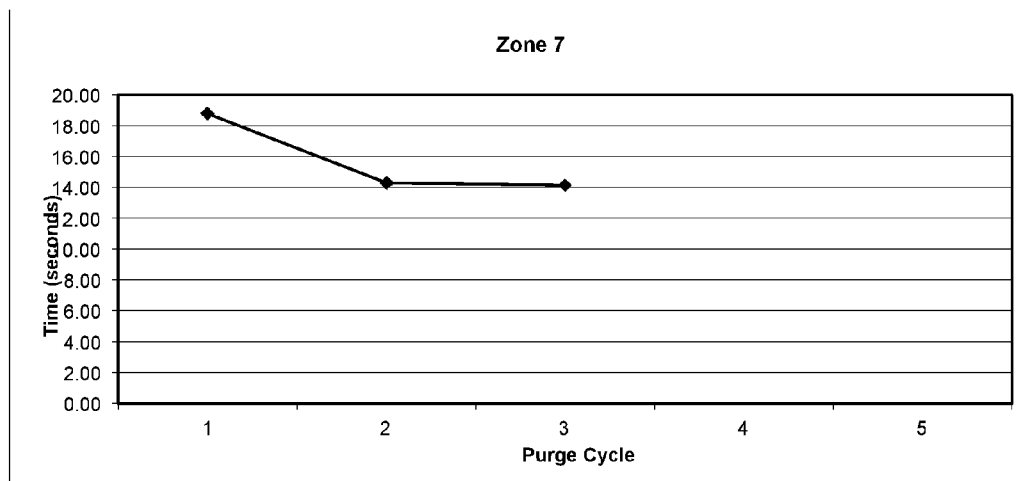

FIG. 6 comprises FIGS. 6A-6O and shows detailed flow diagrams illustrating a specific embodiment of the present invention in detail. FIGS. 6A-6C illustrate the process performed when purge controller selector switch 33 is turned to "Water Off," or if it remains in "Water Off" after power was removed from Purge Controller 17. FIG. 6D illustrates the housekeeping process performed when purge controller selector switch 33 was in the "Water Off" position and continues to be in the "Water Off" position (no change). FIGS. 6E-6G illustrate the process performed when purge controller selector switch 33 is turned to "Water On." FIGS. 6H-6O illustrate the process performed when purge controller selector switch 33 is turned to "Purge." The processes performed by the embodiment of FIG. 6 produce the error codes shown in Table 2, and this embodiment was used to generate the data shown in Table 3 and FIG. 7.

FIG. 7 comprises FIGS. 7A-7G, comprising plots illustrating experimental data gathered with apparatus and methods according to the present invention, and in particular the embodiment of FIG. 6. Table 3 below provides data associated with the plots.

TABLE 3

Purge Data

| Date: | 6 May 2012 | |
|---|---|---|
| Time Purge Start: | 3:01:00 PM | |
| Time Purge End: | 4:11:30 PM | |
| Reservoir: | 5 Gallon | |
| Compressor: | 3.7 SCFM at 40 PSI | 2.6 SCFM at 90 PSI |
| Code: | TIME_BOARD_01CC.HEX | |

Pressure Transition Time for Each Zone, Each Cycle in seconds

| | Cycle Number | | | | |
|---|---|---|---|---|---|
| Zone | 1 | 2 | 3 | 4 | 5 |
| 1 | 46.57 | 16.77 | 14.14 | 11.55 | 10.37 |
| 2 | 25.25 | 16.45 | 14.45 | 12.13 | 12.02 |
| 3 | 32.11 | 16.16 | 13.16 | 11.52 | |
| 4 | 11.84 | 8.41 | 7.81 | | |
| 5 | 65.65 | 45.84 | 41.63 | | |
| 6 | 16.02 | 10.23 | 9.00 | 8.51 | |
| 7 | 18.78 | 14.29 | 14.14 | | |

Time Difference Between Cycles in Percent

| Zone | 1-2 Diff | 2-3 Diff | 3-4 Diff | 4-5 Diff |
|---|---|---|---|---|
| 1 | −178% | −19% | −22% | −11% |
| 2 | −53% | −14% | −19% | −1% |
| 3 | −99% | −23% | −14% | skip |
| 4 | −41% | −8% | skip | skip |
| 5 | −43% | −10% | skip | skip |
| 6 | −57% | −14% | −6% | skip |
| 7 | −31% | −1% | skip | skip |

While the exemplary preferred embodiments of the present invention are described herein with particularity, those skilled in the art will appreciate various changes, additions, and applications other than those specifically mentioned, which are within the spirit of this invention.

What is claimed is:

1. Apparatus for automatically purging an irrigation system having an irrigation controller controlling water flow and air flow into a plurality of irrigation zones, the apparatus comprising:
    a low-pressure switch for determining when pressure within the irrigation system passes a low-pressure threshold;
    a high-pressure switch for determining when pressure within the irrigation system passes a high-pressure threshold;
    a timer configured to measure pressure transition times based on the amount of time between a high pressure threshold and a low pressure threshold;
    a source of compressed air; and
    a purge controller including circuitry constructed and arranged to monitor the low-pressure switch and the high-pressure switch, to designate irrigation zones, and to apply compressed air to designated irrigation zones to blow water out of the designated irrigation zones based upon the low-pressure switch and the high-pressure switch;
    wherein the purge controller is further constructed and arranged to automatically blow out designated zones a specified number of blow-out cycles, wherein the number of blow-out cycles is specified based on a measured pressure transition time and wherein an irrigation zone is purged after it is blown-out the specified number of cycles.

2. The apparatus of claim 1 wherein the purge controller further comprises circuitry for measuring an initial pressure transition time a designated zone takes to be blown-out and for setting the specified number of blow-out cycles based upon the initial pressure transition time.

3. The apparatus of claim 1 wherein the purge controller further comprises circuitry for measuring a current pressure transition time a designated zone takes to be blown-out and for setting the specified number of blow-out cycles based upon the current pressure transition time.

4. The apparatus of claim 3 wherein the circuitry for setting the specified number of blow-out cycles further includes circuitry for limiting the specified number of blow-out cycles to a maximum value.

5. The apparatus of claim 1 further comprising a switch connected to the purge controller, the switch and the purge controller constructed and arranged such that the purge controller allows water to flow to the irrigation system, prevents water from flowing to the irrigation system, or purges the irrigation system according to the position of the switch.

6. The apparatus of claim 1 further comprising a latching solenoid valve controlled by the purge controller for selectively allowing water to flow to the irrigation system.

7. The apparatus of claim 1 wherein the source of compressed air comprises a quick-release connection for connecting to an air compressor and wherein the purge controller selectively turns on the air compressor.

8. The apparatus of claim 1 further comprising a monitoring station controlled by the purge controller including an LED display for indicating the state of the system.

9. The apparatus of claim 8 wherein the display includes lights configured to indicate a system error.

10. The apparatus of claim 9 wherein the display includes lights configured to indicate zones being purged.

11. The apparatus of claim 8 further comprising:
a switch configured to allow a user to selectively activate the purge controller.

12. The apparatus of claim 11 wherein the switch is further configured to selectively allow water to flow to the irrigation system.

13. The apparatus of claim 1 wherein the purge controller and the irrigation controller share a common power source for powering irrigation zone valves which is optically isolated from the purge controller's internal power supply.

14. The apparatus of claim 1, further comprising a valve configured to prevent water flow back into a water source.

15. The apparatus of claim 1, further comprising a valve configured to prevent water flow back into the source of compressed air.

16. The apparatus of claim 15, wherein the valve comprises a check valve disposed between the low-pressure switch and the high-pressure switch.

17. The apparatus of claim 1, further comprising circuitry configured to store a current state of the apparatus and to restore the state of the apparatus after a power failure.

18. The apparatus of claim 1, further comprising a 120 VAC switch configured to selectively activate the source of compressed air according to the purge controller.

* * * * *